(12) United States Patent
Beale

(10) Patent No.: US 7,011,322 B2
(45) Date of Patent: Mar. 14, 2006

(54) AUTOMATIC TRANSMISSION WITH STEPLESS, CONTINUOUSLY VARIABLE SPEED AND TORQUE RATIO

(76) Inventor: William T. Beale, 13818 Robinson Ridge Rd., Athens, OH (US) 45701

( * ) Notice: Subject to any disclaimer, the term of this patent is extended or adjusted under 35 U.S.C. 154(b) by 0 days.

(21) Appl. No.: 10/446,556

(22) Filed: May 28, 2003

(65) Prior Publication Data

US 2004/0000206 A1     Jan. 1, 2004

Related U.S. Application Data

(60) Provisional application No. 60/392,067, filed on Jun. 27, 2002.

(51) Int. Cl.
    *B62M 1/02*     (2006.01)

(52) U.S. Cl. .......................... 280/260; 474/49
(58) Field of Classification Search ................ 280/260, 280/259, 261, 243, 246, 251, 253, 255, 258; 74/49, 36, 21, 37
See application file for complete search history.

(56) References Cited

U.S. PATENT DOCUMENTS

| | | | | |
|---|---|---|---|---|
| 1,788,729 A | * | 1/1931 | Meier | 368/208 |
| 2,023,579 A | * | 12/1935 | Dodge | 74/148 |
| 2,584,447 A | * | 2/1952 | Hayot | 474/50 |
| 4,762,332 A | * | 8/1988 | Seol | 280/250.1 |
| 4,781,663 A | * | 11/1988 | Reswick | 474/49 |
| 5,054,801 A | * | 10/1991 | Maguire | 280/261 |
| 5,272,928 A | * | 12/1993 | Young | 74/137 |
| 5,772,546 A | * | 6/1998 | Warszewski | 474/50 |
| 6,432,009 B1 | * | 8/2002 | Hansen et al. | 474/49 |

* cited by examiner

*Primary Examiner*—Anne Marie Boehler
(74) *Attorney, Agent, or Firm*—Frank H. Foster; Kremblas, Foster, Phillips & Pollick

(57) ABSTRACT

An automatically and smoothly continuously variable transmission, particularly for a bicycle, for transmitting input mechanical energy from a crank to the drive wheel. A ratchet, having an oscillatory, alternating motion member and a continuous rotary motion member, connected to the driven wheel, has a drive spring drivingly linked between the ratchet alternating member and the crank for driving the ratchet alternating member in one direction of motion. A return spring is linked to the ratchet alternating member for applying a return force upon the ratchet alternating member to return the alternating member in the opposite direction.

17 Claims, 16 Drawing Sheets

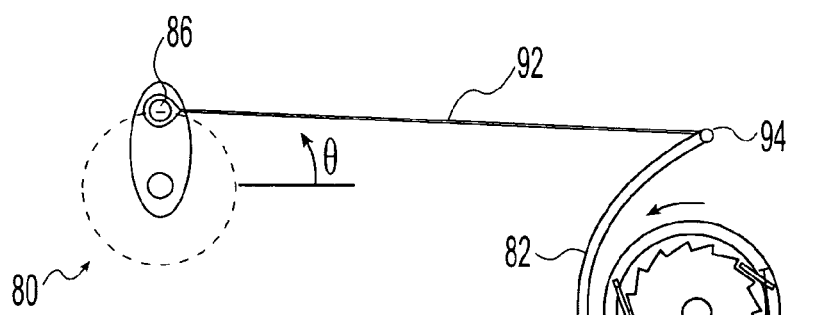
Fig. 6
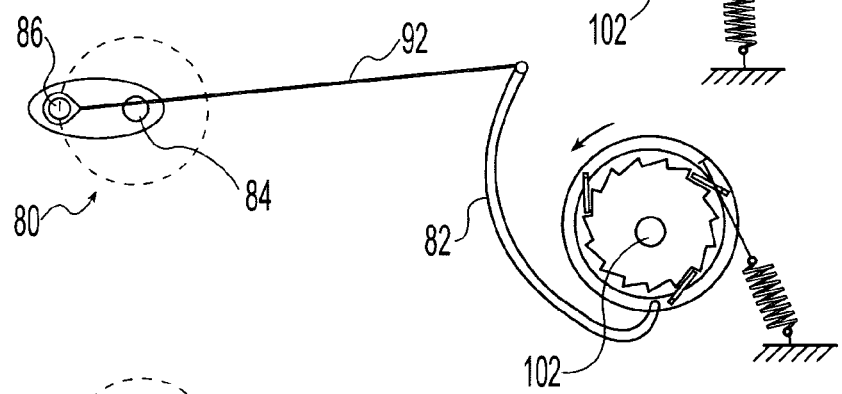
Fig. 7
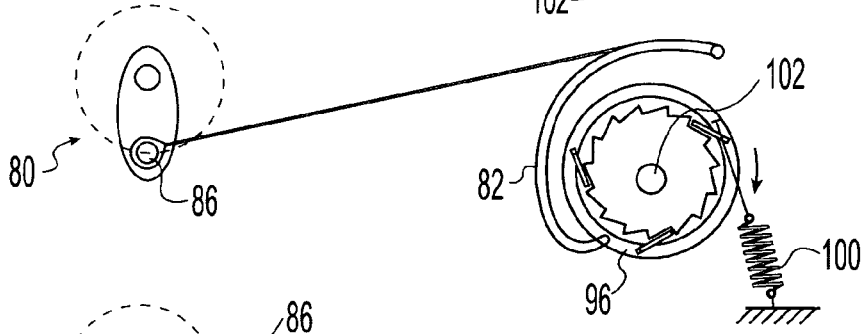
Fig. 8
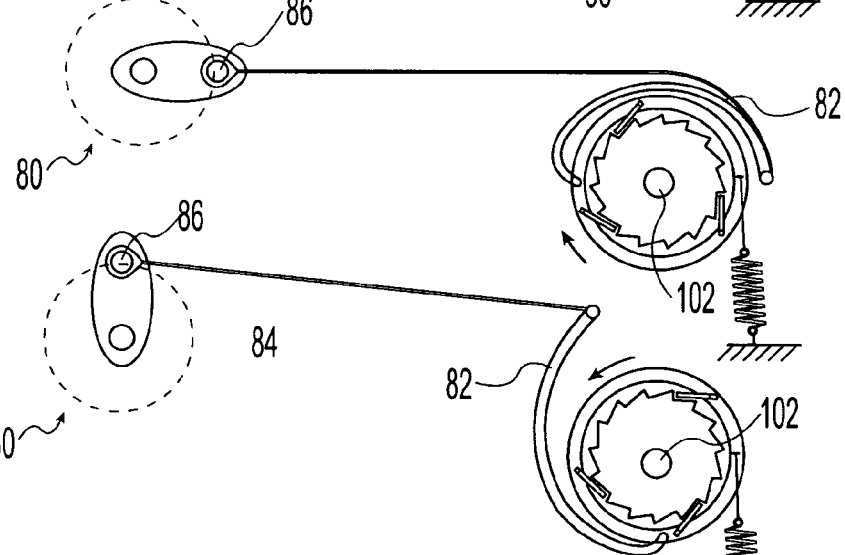
Fig. 9
Fig. 10

*Fig. 14* LOCKED WHEEL (d)

*Fig. 15* SPEED RATIO d/D = 1/4
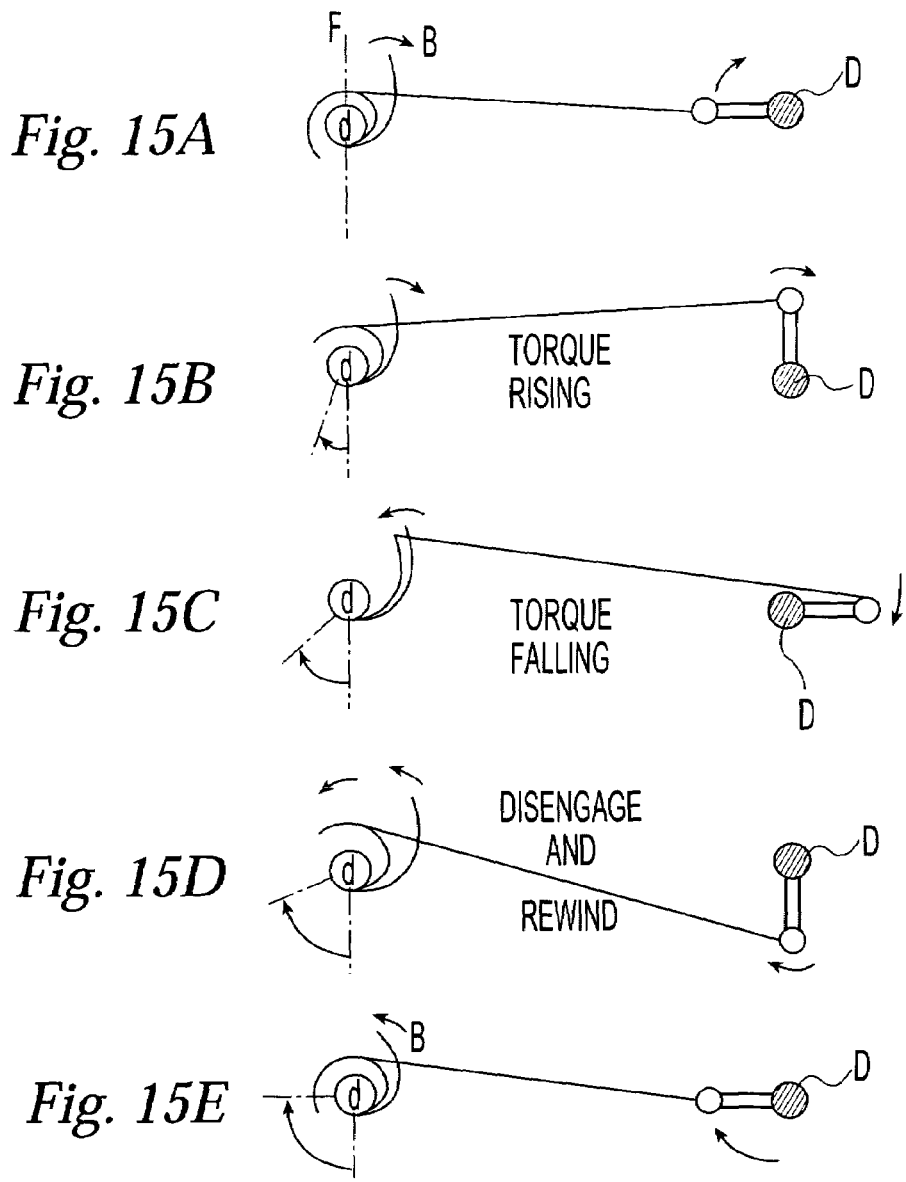
*Fig. 15A*
*Fig. 15B* TORQUE RISING
*Fig. 15C* TORQUE FALLING
*Fig. 15D* DISENGAGE AND REWIND
*Fig. 15E*
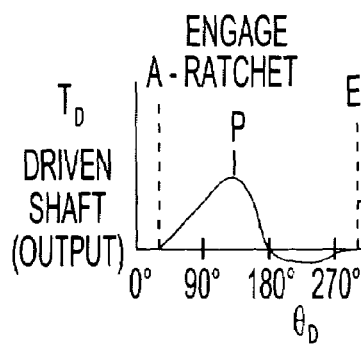
*Fig. 15F*
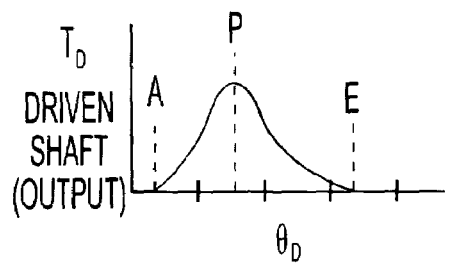
*Fig. 15G*

*Fig. 16* SPEED RATIO d/D = 3/4

$\theta_D = 0°$ $\theta_D = 90°$ $\theta_D = 180°$ $\theta_D = 270°$ $\theta_D = 360°$
d ROTATED 270°   D ROTATED 360°

AUTOMATIC TRANSMISSION WITH STEPLESS, CONTINUOUSLY VARIABLE SPEED AND TORQUE RATIO

CROSS-REFERENCES TO RELATED APPLICATIONS

This application claims the benefit of U.S. Provisional Application No. 60/392,067 filed Jun. 27, 2002.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to transmissions for varying the speed and torque ratio between an input driving member to which mechanical energy is applied and an output driven member. More particularly the invention is an entirely mechanical transmission mechanism, which automatically and continuously varies the transmission ratio in a stepless manner as a function of input and output torque and speed. Although the transmission is particularly suitable for bicycles, it also has properties which are advantageous for other vehicles and other machines.

2. Description of the Related Art

There are numerous transmissions in the prior art for interposition in the drive train of vehicles and other machines so that the drive ratio can be varied in order that a prime mover can operate over its operating torque and speed range while permitting the output to vary over different and usually considerably broader torque and speed ranges needed during various anticipated modes of operation. Initially, transmissions were manually operated to select one of several discrete transmission ratios. Bicycles typically use derailleur systems or gear transmission in which selected different sprockets or gears are alternatively engaged to select from the available ratios.

The prior art recognized that ease and convenience would be enhanced if the vehicle operator were relieved of the responsibility for deciding which transmission ratios would be appropriate for the encountered conditions and for manually shifting the transmission. Consequently, there have been a variety of automatic transmissions. Some of these are based upon the automation of a manual transmission using speed or torque sensing devices. Some shift between discrete gear engagement choices while others use belt and pulley systems which vary the effective pulley diameter. Still others are hydraulic systems which use hydraulic pumps, motors and valving arrangements.

Such prior art transmission systems, although they accomplish the necessary drive ratio changes, are complicated, and therefore expensive, devices which are consequently subject to several modes of failure. Some such systems shift abruptly or in a stepped manner between discrete ratios instead of in a smoothly continuous manner.

It is therefore an object and feature of the invention to provide an automatic transmission which is both simple in its construction, requiring few parts, and which may be entirely mechanical, making it particularly suitable for bicycles.

A further object and feature of the invention is to provide a transmission which progressively varies its drive ratio in a smoothly continuous manner in response to variations in load power demand and input power.

A further object and feature of the invention is to provide a transmission which is particularly suitable for a bicycle and allows a rider to pedal at the rider's comfortable pedal speed and torque while the transmission automatically varies the drive ratio in response to load power demand, such as caused by inclined surfaces, without causing substantial variations in the input torque and speed perceived by or required by the rider.

A further object and feature of the invention is to provide, in combination with one or more of the above features, a transmission which also allows the rider to pedal faster or slower to accelerate or decelerate without experiencing substantial pedal torque variations so that the rider perceives a response from the pedal effort which is similar to that given by a conventional bicycle.

Yet another object and feature of the invention is to provide a transmission which can be adapted to drive multiple wheels on a vehicle and allow the wheels to turn at different speeds so that the transmission also provides a differential function and applies drive torque to all wheels, including a nonrotating wheel.

Another object of this invention is to provide a transmission that can drive the same shaft at different torque ratios, as for example, on a bicycle, a linkage on one side of the wheel can drive preferably at low speeds and high torque, and another linkage, driven from the same driving crankshaft, can drive the same wheel more optimally at a higher speed and lower torque, but at any instant, both sides are driving the wheel at the same speed. This feature can be extended so that a single driving shaft can drive any number of different driven shafts simultaneously at different speeds and or torques, or, can drive a single driven shaft with any number of linkages having different torque-speed characteristics.

BRIEF SUMMARY OF THE INVENTION

The invention in its broadest aspect is the interposition of a spring in the input drive linkage to the alternating motion member of a ratchet mechanism to form a mechanical transmission for transmitting input mechanical energy from an input driving member, which is drivable in alternating motion by a source of input mechanical energy, to an output driven member. More specifically, the invention has an input driving member that moves and transmits power into transmissions embodying the invention. A ratchet, including an alternating motion member and a continuous motion output driven member, has a drive spring drivingly linked between the ratchet alternating member and the input driving member and for transmitting a force applied to the input driving member through the spring to the ratchet alternating member. The spring is capable of storing and releasing energy and also of deflecting so as to allow full motion of the input driving member regardless of the motion of the output driven member. The force applied by the drive spring to the ratchet alternating member moves the alternating member in one direction of motion. The drive spring may be anywhere between the input driving member and the ratchet alternating member and may be of any physical configuration and any force-motion relation. A return spring is drivingly linked to the ratchet alternating member for applying a return force upon the ratchet alternating member, opposite to the force applied by the drive spring, to move the alternating member in the opposite direction. Operation is particularly enhanced if the input driving member is a crank having its crank pin linked to the drive spring.

BRIEF DESCRIPTION OF THE SEVERAL VIEWS OF THE DRAWINGS

FIGS. 5–10 are a series of simple diagrammatic views illustrating the fundamental structures and the operation of the preferred embodiment of the invention.

Figure 1:
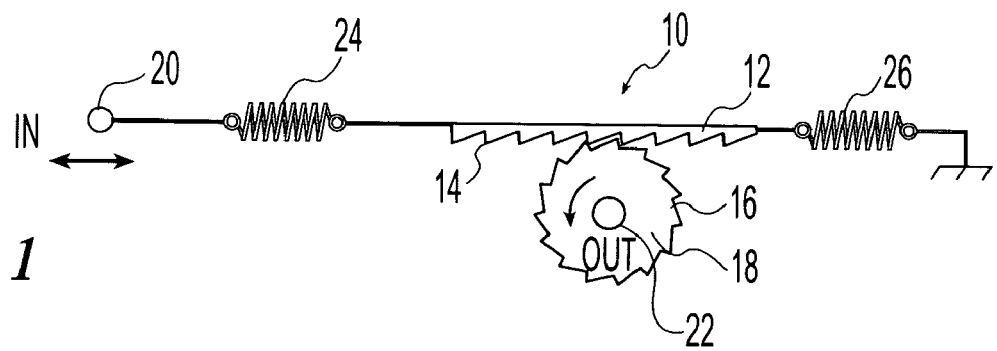
FIGS. 1–4 are simple diagrammatic views illustrating the fundamental principles of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the terms "linked", "drivingly linked" or "connected" or terms similar thereto are used to refer to the transmission of a force or motion from one body to another. They are not limited to direct connection, but include connection through other elements where such connection is recognized as being equivalent by those skilled in the art. For example, a drive train can have a series of serially connected mechanisms which transfer mechanical energy from one to the next and it is well known that additional mechanisms can be interposed in a drive train without changing its fundamental operation.

DETAILED DESCRIPTION OF THE INVENTION

This invention involves fundamental principles of mechanical motion and mechanisms, and therefore this description begins with definitions of some of the terminology which is used. These definitions are important, both for understanding the principles of operation of the embodiments described and also for appreciating the scope of the many possible alternative embodiments which can apply these fundamental principles. Following the definitions is a description of basic concepts, which are applicable to the invention. Thereafter, the structure of the preferred embodiment is described, along with other embodiments and that is followed by a description of its operation. Finally, there is a description of enhancements which improve embodiments of the invention, alternative embodiments and some variations.

1. Definition of Terms

Most of the fundamental terminology applied in this description is derived from the Classification Manual of the United States Patent and Trademark Office. Although the prior art has known many mechanisms for converting alternating motion to continuous motion, embodiments of the present invention additionally include a spring element that provides a smoothly continuous, average transmission ratio, which is automatically varied in a non-stepwise or stepless manner from zero or infinity (depending upon the direction in which the ratio is expressed) to a maximum or minimum ratio, limited only by the limitations of the structural parts and the ability to provide input work energy.

"Alternating motion" is intermittent movement along a path, first in one direction and then in the opposite direction. Although the path of alternating motion is ordinarily either alternating rotary motion along an arc of a circle, or alternating linear motion as linear displacement along a line, in the form of reciprocation, alternating motion can occur along other paths. "Continuous motion" is motion continuing in the same direction and ordinarily occurs as linear displacement along a line or as continuous rotary motion. Continuous motion can be intermittent in time, that is it can have intervals of no motion or different speeds of motion. The word "continuous" in the term "continuous motion" implies that the direction of motion continues the same, not that the motion continues in time.

A well-known device for converting alternating motion to continuous motion is a ratchet. The term "ratchet" is used in this description to generically refer to any device which converts alternating motion to continuous motion. Such devices are usually of an intermittent grip type, in which driving engagement is affected during one direction of an alternating motion, and a driving force is applied in the direction of motion during that engagement. In the opposite direction of motion, the intermittent grip device disengages to apply no driving force in the opposite direction and returns to a starting position in its cycle of operation. Ratchets therefore typically have an alternating motion member and a continuous motion member, which operate with corresponding motions. Although, for efficiency, a ratchet preferably applies the driving force in one direction and applies no driving force in the opposite direction during which its alternating member returns along its path of motion, a ratchet can also simply apply more force in one direction than in the other, such as a stronger frictional engagement in one direction, with a lesser frictional engagement and slippage in the opposite direction. Thus, a ratchet typically applies a drive force in intermittent steps, with intermittent grip devices, such as pawls or frictionally engaging members and teeth in the form of a ratchet bar or rack. Other ratchet devices include ball clutches or roller clutches. There are a variety of prior art ratchet devices available to the designer, including mechanical, hydraulic, magnetic, electrical and pneumatic devices. As also known to those skilled in the art, clutches can also be adapted for use as a ratchet. Such devices synchronize the engagement and disengagement of the clutch with the motion of the alternating motion member component. These, for example, can use a displacement, velocity or acceleration sensor and alternately engage the clutch at the limits of movement of the alternating member.

"Rotary motion" is the turning of a body about an internal axis such that a point on the body travels through an arcuate path. Oscillating motion is alternating motion of less than 3600 along an arcuate path. Reciprocating motion is alternating motion along a straight-line path.

"Springs" are important elements of embodiments of the invention. A "spring" is a device which stores mechanical, potential energy as an increasing function of its distortion, displacement, deflection or rotation (collectively referred to as displacement or deflection). A spring stores energy when it is displaced and returns the same energy when it returns to its non-displaced condition. This storage and return of energy can be accomplished with a low energy loss when properly designed. The spring applies a force which is an increasing function of its displacement. The relationship between spring force and spring displacement is the "spring force coefficient" which, when the relationship is linear, is known as the spring constant. Although the increasing functional relationship between spring displacement and spring force and the increasing functional relationship between energy stored and displacement are linear over the useful operating range of common springs, these relationships may alternatively be nonlinear. For some embodiments of the invention, a nonlinear functional relationship is preferred so that the force and stored energy per unit of displacement increases as displacement increases.

One type of spring is the mechanical spring, which is displaced resiliently or elastically by mechanical deformation. These include coil springs, torsion bar springs, planar springs and other elastic bodies, such as an elastic cord or ribbon. Another type of spring is the gas spring, in which a fluid, typically a gas, is confined to a variable volume container, such as an enclosed cylinder with a piston. A cantilever spring is a body, typically a beam, which is anchored to another body at an end and can bend in a resilient, elastic manner. The beam may be linear, curved, or include bends. The spring may also have variations in width and thickness along it length which can introduce desired nonlinearities into its spring force coefficient. Thus, a spring may be formed with any body that can flex, bend, expand, compress, or otherwise be deformed in a resiliently elastic manner. Springs can apply their force in a direction along a line or as a torque. A spring can also be a magnetic spring in which magnetic attraction or repulsion links the force and the change in spacing provides the displacement or distortion. Such a spring can use permanent magnets or electromagnets.

A "crank" is a well known device which has a "crankshaft" and rotates around a central axis through the crankshaft. A crank also has a "crank arm" extending from the crankshaft with a crank "pin" mounted to the crank arm at a selected radius, known as the crank throw, from the central axis so that the crank pin moves along a circular path about the central axis. However, it is well known that this is an elementary device and there are a broad variety of alternative structures which can form an elementary crank. Additionally, the component parts are not limited to structures typically identified by this structural terminology. For example, the "crank arm" is not confined to an arm, but can, for example, be a wheel with a crank pin extending from it. Consequently, the terminology used to refer to the crank is used generically to refer to the structures which function as the elementary components of a crank. The term crankshaft refers to the structure which rotatably mounts the crank and the term crank pin refers to the structure to which a body, such as a connecting rod, is rotatably mounted so that it can move in alternating motion as the crank moves in continuous, rotary motion.

The term "flexible drive linkage" is used to refer to a cord, cable, tape, chain or the like which is rigid in tension so that it can transmit a force but is additionally capable of flexing laterally or bending without reaching its elastic limit.

2. Basic Concepts

The most basic concepts of the invention are illustrated in simplified form in FIGS. 1–4.

The simplified mechanical transmission of FIG. 1 has a ratchet 10 formed by a ratchet bar 12, with teeth 14 engaging the teeth 16 of a ratchet wheel 18. In this simplified transmission, an input driving member 20 is connected to a source of input mechanical energy, such as a linearly, reciprocating prime mover. A rotatable shaft 22, fixed to the ratchet wheel 18, forms a continuous motion output driven member. The ratchet bar 12 forms an alternating motion member, which is connected through a drive spring 24 to the input driving member 20. A return spring 26 is attached to the ratchet bar 12. The springs 24 and 26 are operated in tension as the input driving member 20 is reciprocated, or moved in alternating motion which has a component of reciprocation. As the input driving member is driven by the prime mover to the left in FIG. 1, springs 24 and 26 are expanded and store energy and move the ratchet bar 12 leftward, causing counterclockwise rotation of the ratchet wheel 18. When the input driving member is moved by the prime mover to the right in FIG. 1, the teeth 14 of the ratchet bar 12 disengage from the teeth 16 of the ratchet wheel 18, so that the teeth of the ratchet bar 12 ride up over the teeth of the ratchet wheel 16. The ratchet bar 12 is pulled to a return position by the return spring 26. This reciprocation cycle is continuously repeated, so that a continuous rotary motion is imparted to the output driven member 22.

An important observation of the operation of the embodiment of FIG. 1 is that, if the amplitude of reciprocation (the displacement during each direction of travel) of the input driving member 20 is always the same constant displacement, the displacement of the ratchet bar 12, the angular rotation of the output driven member 22 and the torque applied to the output driven member 22 will all be a function of the torque loading applied to the output driven member 22 and the speed of the input driving member and the output driven member. The instantaneous torque applied to the output driven member will also vary as a function of time, that is a function of the phase angle of the cyclical travel of the input driving member 20. Torque will ordinarily be applied to the output driven member during only a portion of the cycle, with no torque applied as the ratchet bar 12 is returned by the spring 26. These torque pulses will, of course, be averaged over the entire cycle. If the torque loading on the output driven member exceeds the torque which can be applied through the drive spring, the torque pulse applied to the output driven member will extend over the entire 360° of the cycle, the alternating motion member of the ratchet will not move, and therefore it will not return. Importantly, although the amplitude of the reciprocation of the input driving member 20 may always be the same, the displacement of the ratchet bar 12, and therefore the torque and speed at the output driven member 22 are not fixed, but rather are variable as a function of torque loading. It is the variable nature of these parameters which permits embodiments of the invention to attain the automatically and continuously smooth, variable ratio of the drive relationship between the input driving member 20 and the output driven member 22.

Figure 2:
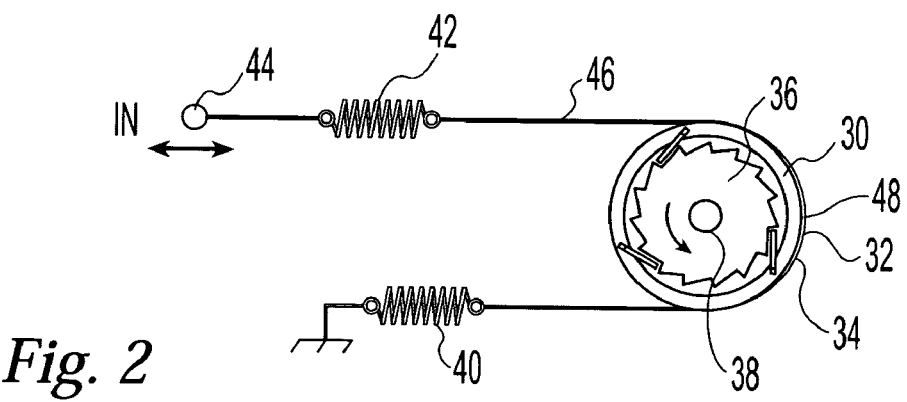

FIG. 2 illustrates the application of the same principles in a similar embodiment, which is different as the result of the use of a rotary, alternating motion member 30 in the form of a pawl carrier 32 having pawls 34 pivotally mounted to the pawl carrier 32 in the conventional manner. The pawls 34 engage a ratchet wheel 36, to which a shaft 38 is fixed to form the continuous motion output driven member. The embodiment of FIG. 2 also has a return spring 40 and a drive spring 42 connected between the pawl carrier 32 and the input driving member 44. The springs 40 and 42 are connected to a flexible tape 46, which is fixed at a point 48 to the pawl carrier 32 to form a flexible drive linkage. As is also true of the FIG. 1 embodiment, drive spring 24 stores energy so that it may apply a force to the ratchet bar 12, even after the input driving member 20 has begun its travel to the right in FIG. 4.

Figure 3:
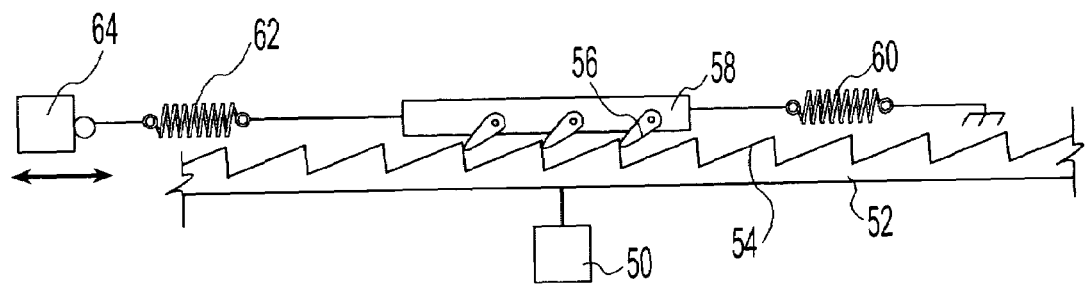

FIG. 3 illustrates yet another simplified embodiment, in which the output driven member 50 is attached to an endless, continuous ratchet bar 52 as may be formed on an endless loop drive train. The teeth 54 of the ratchet bar 52 are engaged by pawls 56, pivotally mounted in the conventional manner to a pawl bar 58. Like the other embodiments, the embodiment of FIG. 3 has a return spring 60 and a drive spring 62, drivingly linked to an input driving member 64.

Figure 4:
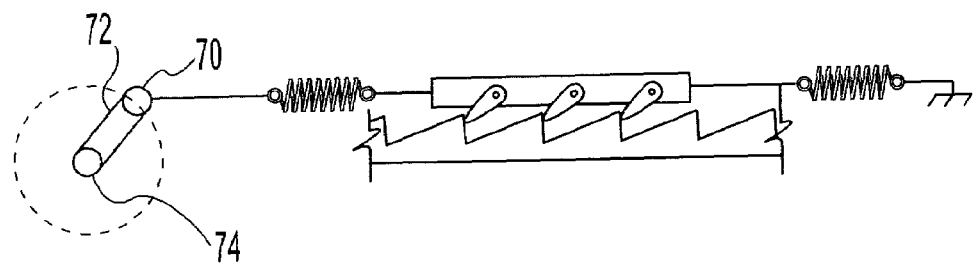

FIG. 4 illustrates another embodiment which is like the embodiment of FIG. 3, except that the driving member is a crank 72 having a crank pin 70 and a central pivot axis in a crankshaft 74. The use of a crank for obtaining the essentially, reciprocating motion substantially enhances the operation of the invention and is applicable to all embodiments. A crank is a well known device for converting continuous rotary motion to alternating motion. A crank requires an additional structure, such as a connecting rod rotatably connected to the crank pin, to obtain the alternating motion. Although a connecting rod can be used in embodiments of the invention, a conventional rigid connecting rod is unnecessary because the linkage between the crank pin and the drive spring can perform that function, so that a reciprocation component of the crank pin motion is applied to the spring. More specifically, because the force applied to the drive spring by the crank pin may always be in the same direction, a flexible tape, chain or equivalent flexible drive linkage, which can apply a force in one direction, may be used and accomplishes the function of a connecting rod, if it is rotatably connected to the crank pin.

From the above it is apparent that the springs used in the present invention are not confined to springs operating in a tension mode. The drive spring or the return spring or both can be equivalently operated as compression springs to apply their respective forces to the ratchet alternating motion member.

3. Preferred Embodiment

Figure 5:
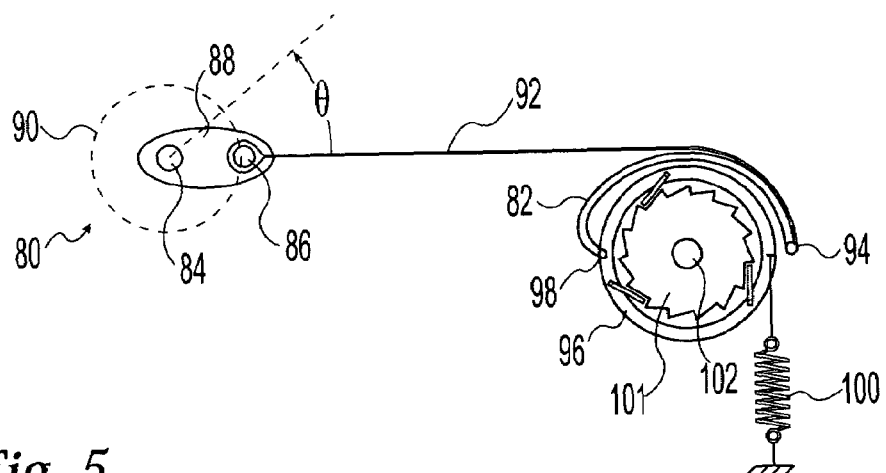

FIG. 5 illustrates two component features, which are preferred for embodiments of the invention. The preferred features are the crank 80 and a cantilever spring 82.

The crank 80 has a crankshaft 84 and a crank pin 86, connected together by a crank arm 88. The crank pin 86 rotates through an angle θ in continuous, rotary motion along a circular path of rotation 90. A flexible tape 92 provides a flexible drive linkage and is rotatably connected at one end to the crank pin 86, and connected at its opposite end to an anchor point 94 on the cantilever spring 82.

Cantilever spring. The cantilever spring 82 is fixed to the ratchet alternating member 96 at an anchor point 98. The cantilever spring 82 is a resiliently flexible cantilevered beam, which is bent around so that, in its most relaxed position, it extends circumferentially at least partially around the ratchet alternating member 96. The most relaxed position of the cantilever spring 82 occurs when the return spring 100 is in its most relaxed position and the crank pin 86 is nearest to the cantilever spring 82, as illustrated in FIG. 5. The return spring 100 may more desirably utilize a flexible drive linkage and connection to the ratchet alternating motion member 96 in the manner illustrated in FIG. 2. The ratchet continuous motion member 101 is connected or fixed to a continuous motion, rotary, output driven member which is an output shaft 102.

Some fundamental principles of operation of the embodiment of FIG. 5 are illustrated in FIGS. 6–10. This preliminary discussion of the operation assumes that sufficient torque is applied to the continuous motion, rotary, output member 102 to overcome the load demand so that it is able to rotate.

As the crank 80 rotates through an angle θ of 90° from the position illustrated in FIG. 5 to the position illustrated in FIG. 6, the cantilever spring 82 will be displaced (i.e. deflected) in the manner illustrated and a torque will be applied on the output driven member 102. One characteristic of this arrangement using a cantilever spring 82 is that, as the spring is deflected outwardly by the force applied upon it through the flexible drive linkage 92, the anchor point 94 becomes radially displaced outwardly from the axis of rotation of the output driven member 102. The result is that the moment arm is also increased as the spring displacement increases. The moment arm increases further as the crank 80 rotates through a further 90° rotation to the position illustrated in FIG. 7. At the 180° position of FIG. 7, the spring displacement and therefore the torque applied through the ratchet to the output driven member 102 is at a maximum, however, the torque exerted on the crank 80 is zero because the force applied by the flexible drive linkage 92 to the crank pin 86 is directed through the central axis of the crank shaft 84, about which the crank rotates. A further 90° of rotation to the position illustrated in FIG. 8 ordinarily permits the alternating motion member 96 of the ratchet to begin its return somewhere within that 90° arc under the force exerted by the return spring 100. A further 90° motion returns the structure to the beginning of the cycle, as illustrated in FIG. 5, which then repeats, as illustrated in FIG. 10.

Figure 11:
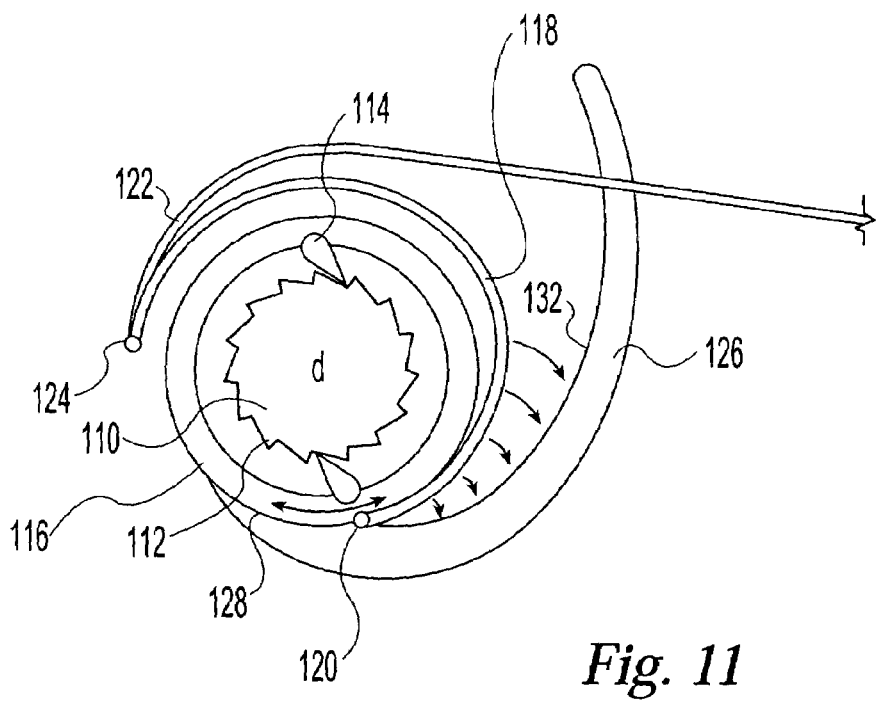
FIG. 11 is a view in side elevation of an embodiment of the invention illustrating a backup wall.

Backup wall. FIG. 11 illustrates an embodiment of the invention, which includes a further feature for enhancing its operation. The embodiment of FIG. 11 has a continuous driven rotary member 110, having teeth 112 engageble with pawls 114, pivotally mounted to an alternating motion member 116 to form a ratchet. A cantilever spring 118 is fixed to the alternating motion member 116 at an anchor point 120. The opposite end of the cantilever spring 118 is fixed to a flexible drive linkage 122, in the form of a flexible tape, at an anchor point 124.

Also fixed to the alternating member 116 is a backup wall 126, which extends outwardly along a curved path from near its place of attachment 128 to the alternating member 116. The backup wall 126 is positioned outwardly of the cantilever drive spring 118 and aligned so that it will be engaged by the cantilever drive spring 118 upon sufficient displacement of the cantilever drive spring 118. Preferably, the backup wall is contoured so that the cantilever drive spring will engage the backup wall progressively further outwardly on the wall as the spring displacement increases. For example, the backup wall may extend along an arc of a circle, but for this embodiment, an involute is believed to provide a better contour.

Figure 12:
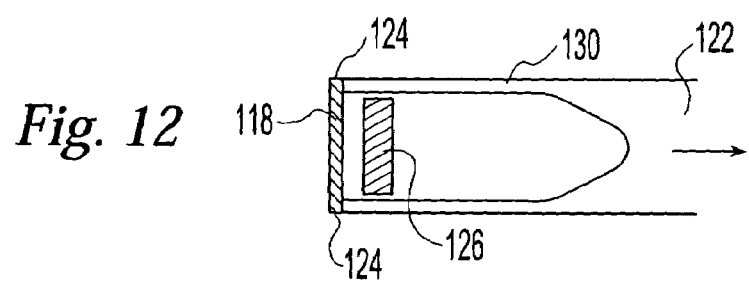
FIG. 12 is view of a segment of the embodiment of FIG. 11 illustrating the connection of the flexible drive linkage.

FIG. 12 illustrates a manner of transmitting the force through the tape flexible drive linkage 122 where the input driving member is located on the opposite side of the backup wall 126 from the drive spring 118. This may be accomplished by having a yoke-like segment 130 formed in the tape 122, so that the backup wall 126 can extend through it. Alternatively, of course, a separate yoke structure may be used. As a further alternative, a slot may be formed longitudinally and centrally through the backup wall 126 with the flexible drive linkage, preferably a narrower cord or cable, extending through the slot.

Figure 13:
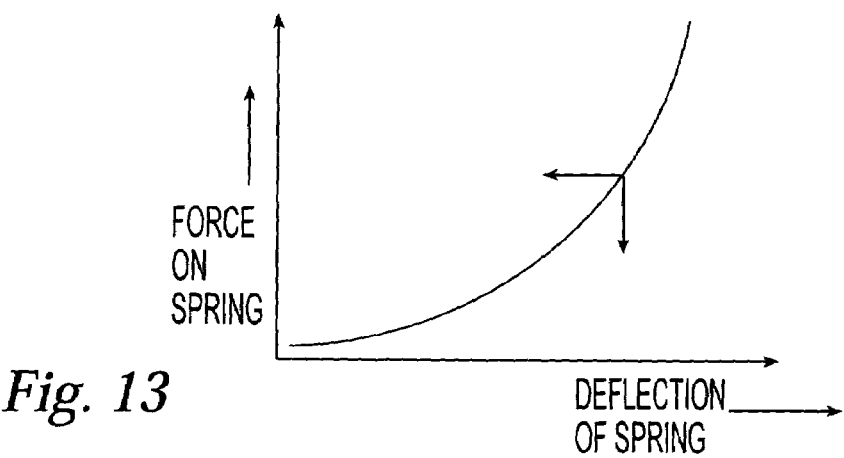
FIG. 13 is a graph illustrating a nonlinear spring force coefficient.

FIG. 13 illustrates that an advantage of the backup wall 126 is to provide a nonlinear spring force coefficient. If the spring force coefficient of the spring alone is linear, the backup wall 126 makes the spring function in a nonlinear manner. As the spring is displaced or deflected, it seats against the interior surface 132 of the backup wall 126 progressively more outwardly from the anchor point 120 along the surface 132 of the backup wall 126 as an increasing function of spring displacement. The result is that the torque applied to the output driven member 110 by the spring increases nonlinearly more rapidly than linearly as a function of spring displacement. The torque may, for example, increase exponentially as a function of displacement.

Additional design advantages can be attained by forming the backup wall so that it too is a spring. For example, the illustrated backup wall can be made sufficiently thin and of an elastic material so that it too operates as a cantilever spring. Consequently, instead of operating only as a rigid backup as described above, the resilient backup wall can provide a spring force and energy storage function when the drive spring seats against the backup wall. In this manner, the spring force applied by the drive spring will increase along a different exponentially varying, resultant spring force coefficient curve as the drive spring engages the backup wall. This provides a designer with additional design options. This would be useful for example in a transmission used by a powerful rider in hill climbing, wherein a very high maximum torque capability at low wheel speed is desired.

Figure 14F:
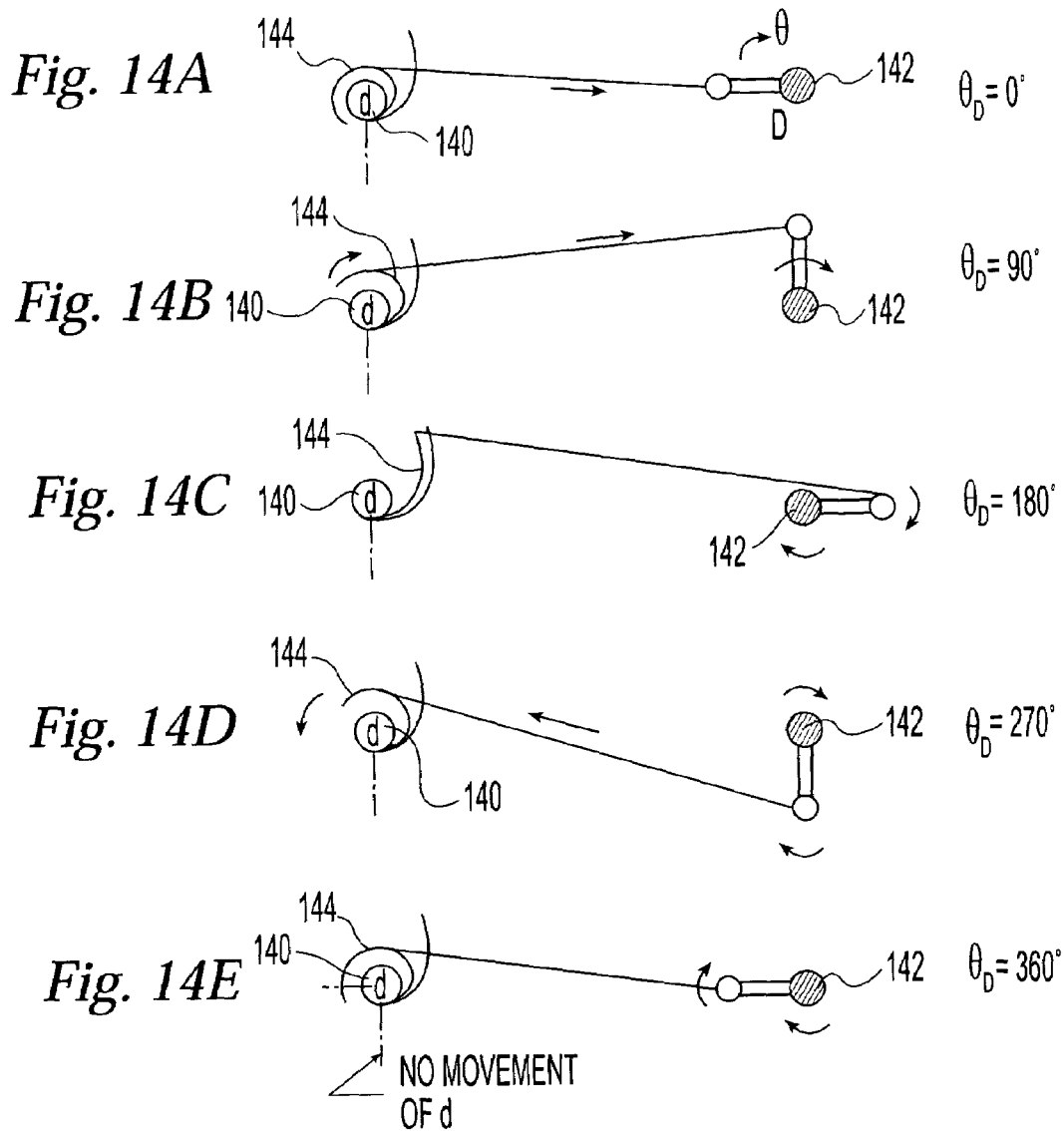
FIGS. 14(A–G), 15(A–G) and 16(A–G) are diagrammatic views illustrating the operation of a preferred embodiment of the invention under three different, representative operating conditions.
Figure 14F:
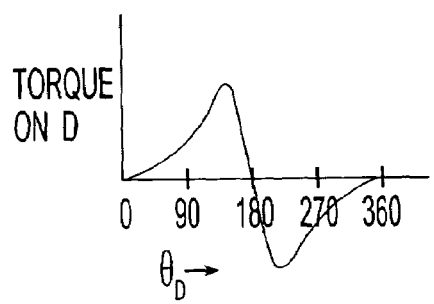

FIGS. 14, 15 and 16 illustrate the operation of the embodiment of FIGS. 11 and 12, as well as other embodiments, under three representative operating conditions. In these Figs., for simplicity of reference, the input driving member is sometimes referred to as "D" and the output driven member is sometimes referred to as "d". Corresponding references are also shown on the drawings.

Figure 14G:
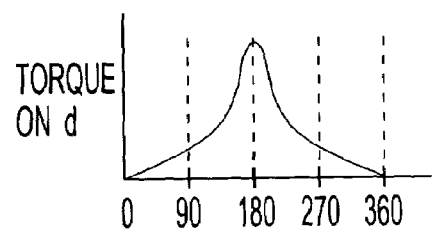
Figure 16A:
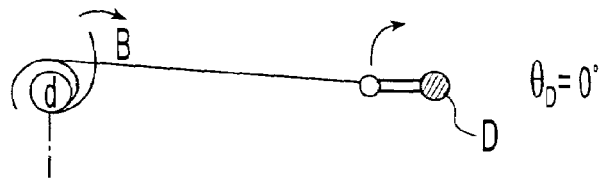
Figure 16B:
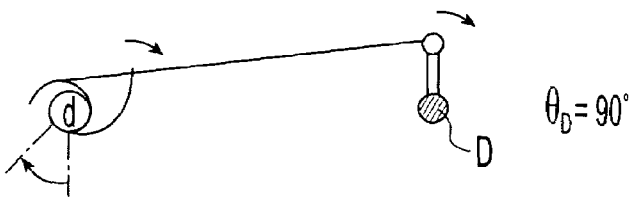
Figure 16C:
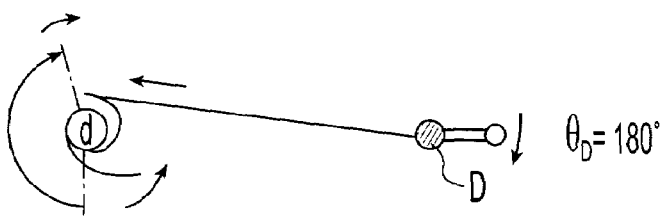
Figure 16D:
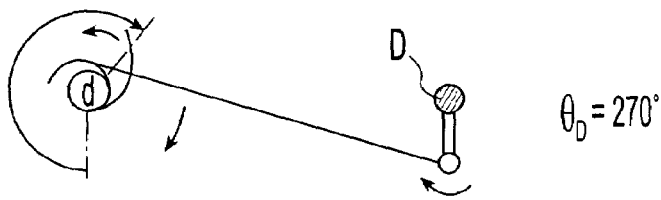
Figure 16E:
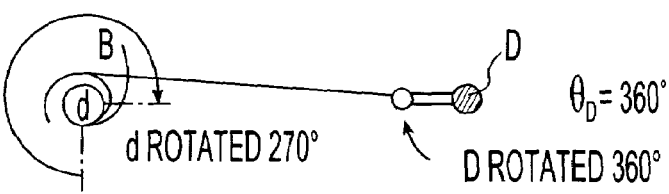
Figure 16F:
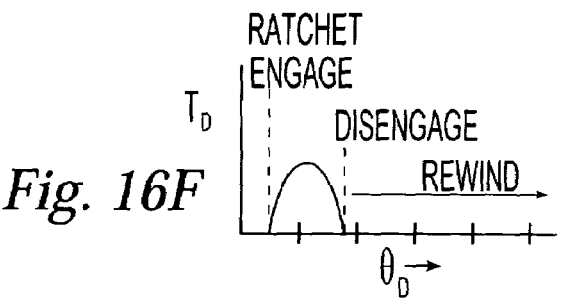
Figure 16G:
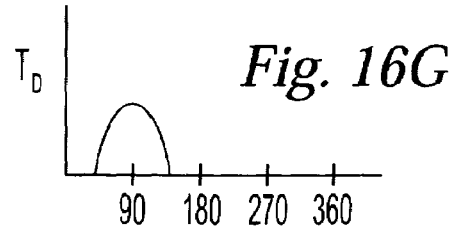

Under the first condition illustrated in FIG. 14, the output driven member 140 is locked in a fixed (non-rotating) stall position because the torque applied by the output driven member is insufficient to overcome the load torque demand. For a bicycle this might occur if the bicycle is stopped and directed steeply uphill. However, the input driving member D, which is a crank 142, is driven at a fixed speed. At a reference angle of rotation of the crank 142, which is 0° illustrated in FIG. 14A, the deflection of the cantilever spring 144 is zero. Under this condition, as illustrated in FIGS. 14F and 14G, the torque on the input crank 142 is zero and the torque applied to the output driven member is also zero.

As the crank 142 is rotated 90° to the position illustrated in FIG. 14B, the drive spring 144 is deflected, and the torque on both the input crank 142 and the output driven member 140 increase, as illustrated in FIGS. 14F and 14G. A further 90° rotation to the 180° position illustrated in FIG. 14C causes the drive spring 144 to be deflected to its maximum displacement, causing a maximum torque to be applied to the output driven member 140, as illustrated in FIG. 14G, while the torque applied to the crank 142 goes to zero, as illustrated in FIG. 14F.

As the crank 142 continues through another 90° of rotation to the position illustrated in FIG. 14D, the deflection of the drive spring 144 decreases, resulting in the application of reduced torque to the output driven member 140, as illustrated in FIG. 14G. Note that after the crank 142 rotates beyond the 180° position of FIG. 14C, a negative torque (i.e. assists continued rotation of the crank) is applied to the crank 142 so that energy is returned to the prime mover rotating the crank 142. This continues, as illustrated in FIGS. 14F and 14G, until the components return at 360° to the position illustrated in FIG. 14E, which is identical to FIG. 14A.

Consequently, over the entire 360° cycle in the case of an output driven member 140 which remains stationary 140, the net energy flow from the crank 142 to the output driven member 140 over the entire cycle is zero, as it must be if the output driven member 140 is locked and can receive no power. As known to those skilled in the art, power is proportional to the product of torque and rotational or angular speed. Therefore, the operation of the embodiment illustrated in FIG. 14 results in repeated waves of rising and falling torque, applied to the output driven member 140. In this stalled condition, there is no net power input at the crank 142 that is required to maintain the high torque on the output driven member 140 and to maintain continuous rotation of the crank, except for frictional and other losses, which are relatively small. An important point is that, under these stalled conditions when there is no output work, there is no net input work, but maximum torque is still applied to the output driven member d. The input shaft D may rotate at any speed, with little effort, since the energy flow is merely in and out of the springs, and is not transmitted outside of the mechanism.

Although the instantaneous torque varies as a function of angular position of the crank, as illustrated in FIGS. 14F and 14G, as will be seen below, these repeated waves of rising and falling torque pulses can be smoothed and averaged by applying enhancements to the present invention. These enhancements include utilizing multiple, parallel, embodiments of the invention, operated at equi-angularly spaced phase relationships, use of a flywheel and, particularly desirable for a bicycle, driving the crank 142 of the present invention at a greater angularly velocity than the pedals of the bicycle.

In the case of a bicycle transmission embodying the present invention, the peak stall torque, illustrated in FIG. 14, may, for example, be about 150 newton meters, which is approximately a typical maximum with conventional bicycle transmissions. The particular torque is designed into the transmission by the geometry of the drive and the spring force and moment arm at maximum deflection.

If the driven output shaft d is moving, the situation is different and is illustrated in FIGS. 15 and 16. Power is required to drive output shaft d against the torque imposed on it by a load, and this power must be delivered to the transmission by input shaft D. The operation over a typical cycle when the output shaft d is moving is illustrated in FIGS. 15 and 16.

In FIGS. 15 and 16, the events are graphed relative to the angular motion of input shaft D, as in FIG. 14, but, as a result of the motion of output shaft d, the results are quite different from the case in FIG. 14 where shaft d is stationary. For the purpose of illustration, an angular velocity of output driven member d is assumed to be ¼ that of input driving member shaft D for FIG. 15, so that when input shaft D has completed a full revolution, output shaft d has rotated only 90 degrees. Referring to FIGS. 15A–15G, as input shaft D rotates from its zero position (full left at 0° of angular rotation in FIG. 15A), it must first accelerate to a velocity to allow ratchet engagement to drive output shaft d. This is point A in FIGS. 15F and 15G, where the ratchet engages and begins to drive the output shaft d. The relative velocity of input shaft D being greater than the velocity at the tape tangent point F (FIGS. 15F and 15G), deflection of the spring increases, until at point P the relative velocity of the tape attachment point on D drops again below the velocity of the attachment point on d, and the deflection of the spring begins to reduce. At point E the spring has once again returned to its zero deflection configuration, and the ratchet disengages. Over the time from ratchet engagement at A to detachment point E, the tape has deflected the spring and there is torque on d, despite the fact that during a portion of this time the velocity of the tape has reversed and the spring is contracting, that is moving to less deflection. The average power delivered to output shaft d and flowing from input shaft D over the entire cycle is proportional to the total torque impulse (product of torque and time) summed over the time interval of a single rotation of input shaft D. That is:

$$P \sim n \int T d\phi$$

This relation is determined not only by the relative deflection of the flexible drive linkage tape but also by the force-moment arm relation of the spring, since both the force and the moment arm are changing with deflection of the tape as is shown in the figure. In general, the power transmitted is proportional to spring deflection, torque arm, fraction of time of engagement and number of cycles per unit time. All four of these increase with an increase in the rotational speed of input shaft D relative to output shaft d. Thus, the power delivered to output shaft d at a fixed rotational speed of shaft d becomes roughly proportional to the fourth power of the input speed of shaft D. It is this fact that makes the transmission input speed of input shaft D nearly constant over a wide range of output speed of output shaft d and input power to D.

At a higher speed ratio, where the rotational speed of output shaft d approaches that of input shaft D, then the time of ratchet engagement, the deflection of the spring, and the moment arm, all are reduced over those of the lower speed ratio condition. FIGS. 16A–16G illustrate the operational relations in a general way when the angular velocity of output shaft d is ¾ that of input shaft D. FIGS. 16A–16G show the outer, alternating motion ratchet member first accelerating to engage and apply a torque to output shaft d, then a period in which the spring is extended to drive output shaft d, then the drive continues as the spring contracts, ending with ratchet disengagement and rewind. At these higher speed ratios, a major part of the crank revolution takes place with the ratchet not engaged, and the ratchet-spring either accelerating to engage or rewinding to its start condition. Since this operation is relatively less efficient than when the speed ratio is lower, the designer may choose to avoid it by choice of a lower maximum speed ratio d/D. For example, the designer can make the effective ratchet diameter of d small in comparison with the crank throw on D.

From the above it can be seen that the general observation may be made that, for each 360° cycle of the input driving member, the output driven member travels through a phase angle which is not a integral multiple of 360° or any other fixed ratio, but instead travels through a phase angle which varies as a function of output speed and torque.

Given design latitude by way of spring stiffness and shape and geometry of the backup wall, it is possible to shape the torque/deflection relation for essentially constant power at constant input speed of input shaft D over a wide range of speeds of output shaft d. For example, the designer can choose a constant power of 250 watts at a pedal speed of 90 rpm, the maximum power speed for many bicycle riders. With such a design, if the rider chose a lower pedal speed, he would feel a rapid drop in power required, since the power delivered varies as the fourth power of pedal speed. At a constant road speed (output shaft d constant speed), a reduction of pedal speed from 90 rpm to 60 rpm would result in a drop of power by a factor of about 5, say from 250 watts to 50 watts, or from a very high power not sustainable except by trained athletes to a comfortable power level for a typical rider.

Figure 17:
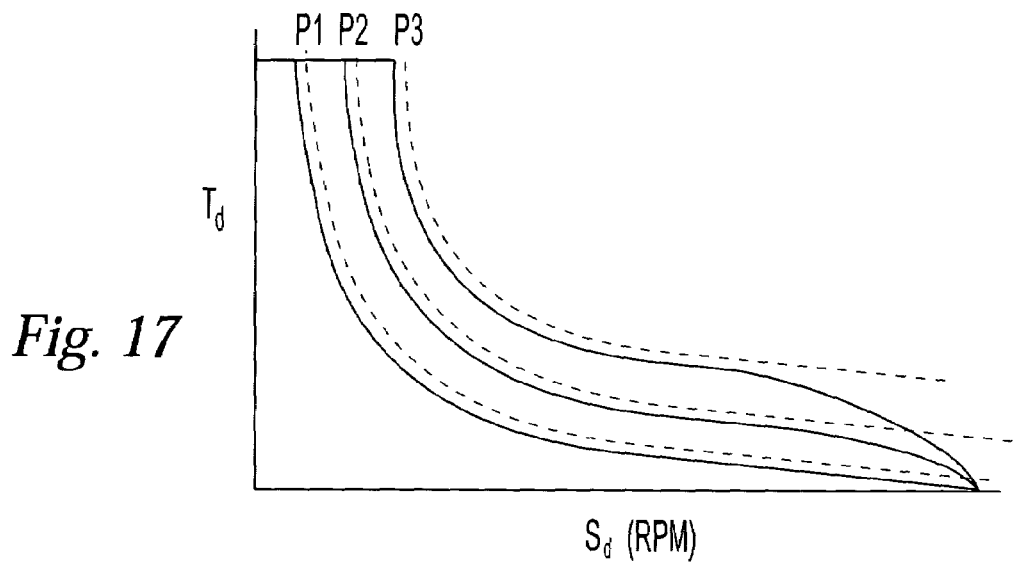
FIGS. 17, 18 and 19 are graphical illustrations of the operation of embodiments of the invention.
Figure 18:
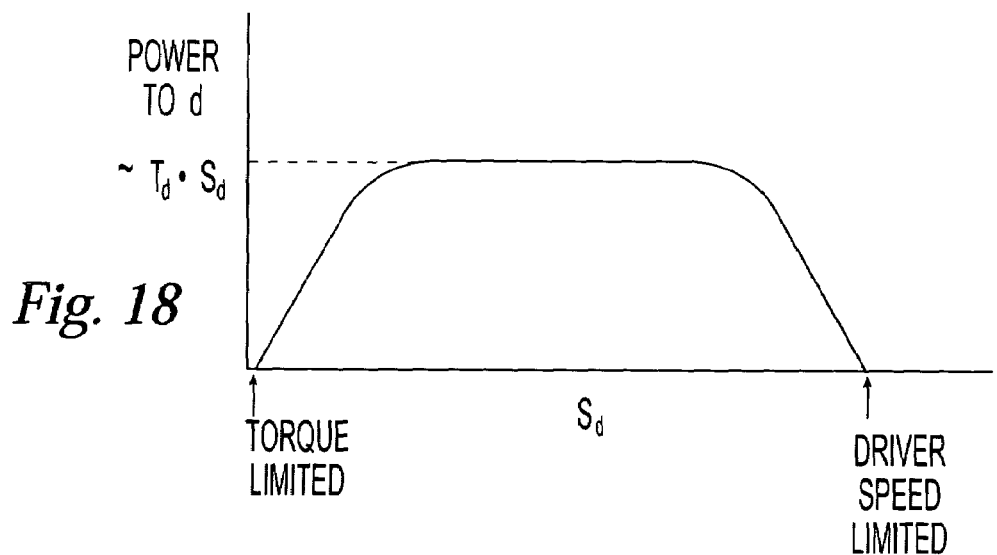
Figure 19:
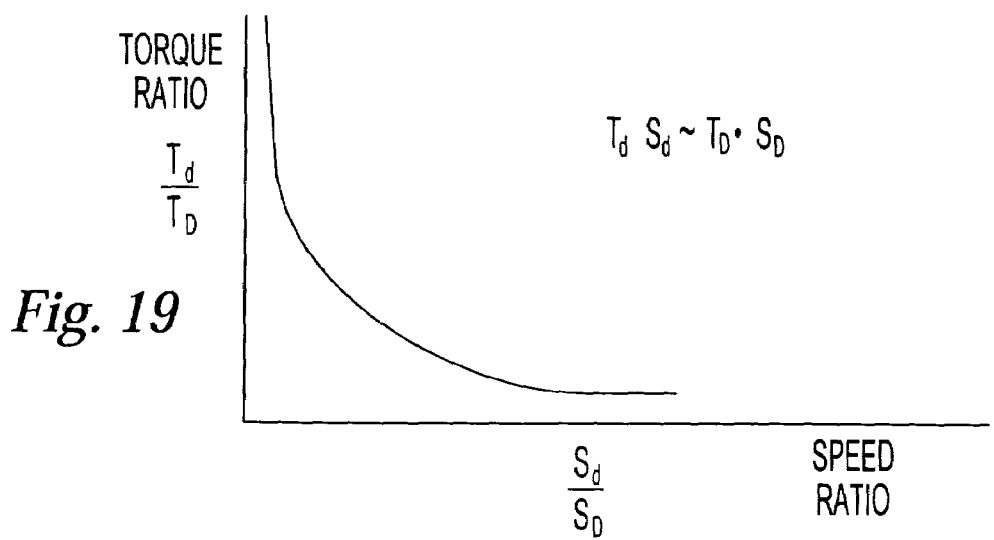

Operational characteristics are illustrated in FIGS. 17–19. If power is held constant, then the variable speed transmission must have a torque vs. speed relation that is hyperbolic, since $P=2\pi Tn$, where P=power, T=torque and n=angular velocity (degrees/second). This is illustrated in FIG. 17 as a family of dashed line hyperbolas P1–P3, each for a different constant power. In a real transmission, however, there is a limit to both maximum torque and maximum rotational speed, so the power curve is limited as shown in solid lines in FIG. 17.

FIG. 18 illustrates these characteristics of a substantially constant power output for a constant power input over a practical, realistic range of operation, with end limits determined at low power by the torque which the spring can apply and at the high power end by the limited power of the input prime mover, such as a bicycle rider.

From the above, it can be seen that embodiments of the invention operate as a transmission, that is provide an automatically and smoothly varying speed and torque ratio between the input and output as illustrated in FIG. 19.

When the torque load demand on the output driven member d is very small, approaching zero, there will be little deflection of the spring. The transmission operating characteristics will approach a fixed speed ratio, at maximum torque ratio and minimum speed ratio determined by the linkage geometry, in particular the diameter ratios of the rotating elements. The torque pulses will be small in amplitude and occur substantially over only a short interval of rotation.

Pulse Smoothing. As described above, torque is applied to the ratchet continuous motion member in a series of pulses, which vary as a function of operating parameters. Similarly, a series of torque pulses are applied to the input driving member during operation which are also a function of the varying operating parameters. Consequently, when the invention is applied to a bicycle, the rider feels these pulsed variations in instantaneous torque. There are several modifications which may be applied to embodiments of the invention to provide a smoother feel to a rider or to otherwise smooth out these pulses. These modifications may be utilized either individually or in combination with other such modifications.

Figure 20:
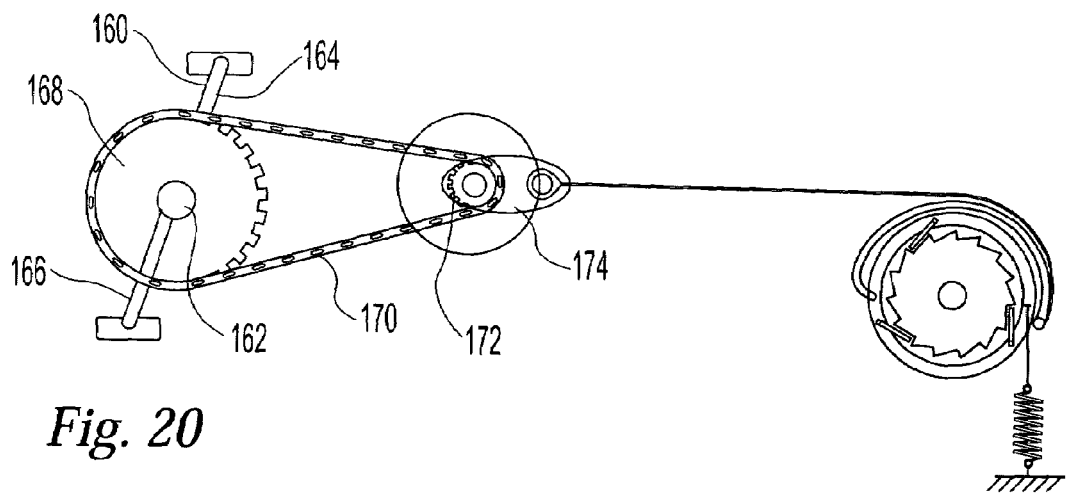
FIG. 20 is a diagrammatic view illustrating an alternative feature of embodiments of the invention.

FIG. 20 illustrates one such modification which is particularly suitable for use on a bicycle. A conventional dual crank bicycle pedal mechanism 160 has a crankshaft 162 about which it rotates and also has a pair of pedal crank arms 164 and 166 fixed to it. A conventional sprocket 168 is also fixed to the pedal mechanism and is drivingly linked by a drive chain 170 to a sprocket 172 fixed to the crank input driving member 174. As is well known, the relative sprocket diameters determine the drive ratio of this fixed ratio transmission. This drive ratio of the fixed ratio transmission driving the crank input driving member is selected to provide a higher angular velocity for the crank input driving member 174 than the angular velocity of the bicycle pedal mechanism. The preferred drive ratio is approximately 6:1 so that every complete revolution of the bicycle pedal mechanism 160 provides 6 revolutions of the crank input driving member 174. Consequently, multiple, shorter, more closely spaced torque pulses are applied to the pedal mechanism during each revolution so that the rider perceives less pulsing.

Figure 21:
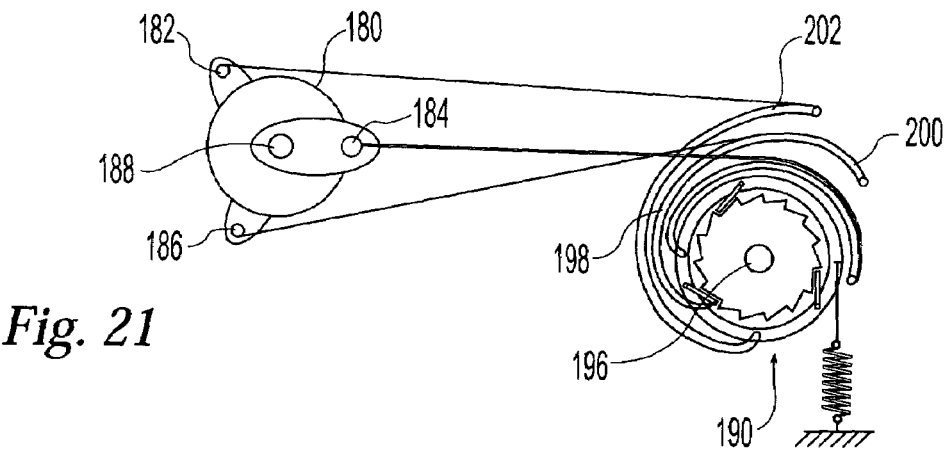
FIG. 21 is a diagrammatic view illustrating another alternative feature of embodiments of the invention.
Figure 22:
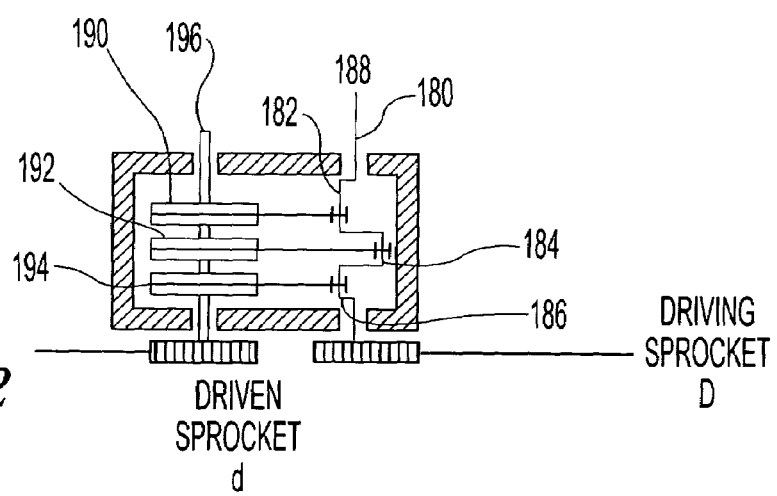
FIG. 22 is a diagrammatic view illustrating yet another alternative feature of embodiments of the invention.

FIGS. 21 and 22 diagrammatically illustrate another modification for smoothing the torque pulses applied to the input driving member. This modification has multiple, parallel replications of an embodiment of the invention which are differently phased. Preferably, the multiple transmissions are phased equi-angularly. This may be accomplished by a crank having a plurality of crank pins angularly spaced around a crank axis of rotation. For example, an input driving member is formed by three-throw crank 180 having three crank pins 182, 184, and 186 which are positioned at 1200 angular intervals about its crankshaft 188. A plurality of ratchets 190, 192 and 194 are mounted to a common output drive shaft 196. Each ratchet includes an alternating motion member as described above and a continuous motion, rotary, output member fixed together and to the common output shaft driven member 196 as described above.

A plurality of drive springs 198, 200 and 202 are each rotatably linked to one of the crank pins and drivingly linked to one of the ratchet alternating members as described above. Each ratchet also has a return spring connected and operating as described above.

The operation of this multiple phased array of parallel transmissions embodying the invention causes the pulses illustrated in FIGS. 14–16 to overlap during each 360° cycle of operation. The resultant instantaneous torque applied to the multi-crank input driving member will be the sum of the instantaneous torques from the individual transmissions. This sum of instantaneous torques from the multiple replications will not vary in amplitude as much as the variations of instantaneous torque of the individual transmissions. More interestingly, because there is an angular interval of crank rotation for each individual transmission when the torque applied to the crank input member is negative, that is, actually assists in driving the crank in rotation, with the multi-crank phased array illustrated in FIGS. 21 and 22, this negative torque represents work being recovered from the spring of one transmission and transferred to drive other transmissions of the array. The smoothing effect of this phased array of transmission can be visualized by replicating the graphs F and G of FIGS. 14–16 on a single graph but as 120° spaced phases and then plotting their sum over a 360° interval.

of course additional pulse smoothing may be obtained by mounting a flywheel to a rotating crank in the manner well known in the art. This, however, would retard acceleration and deceleration because of the momentum of the flywheel.

Figure 24:
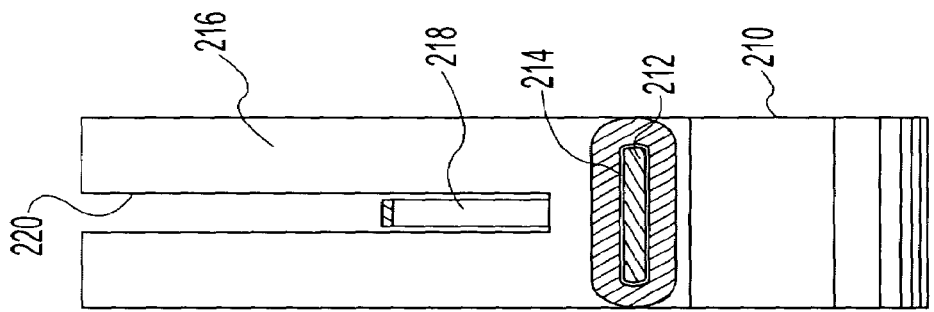
FIG. 24 is an end view of the embodiment of FIG. 23.
Figure 23:
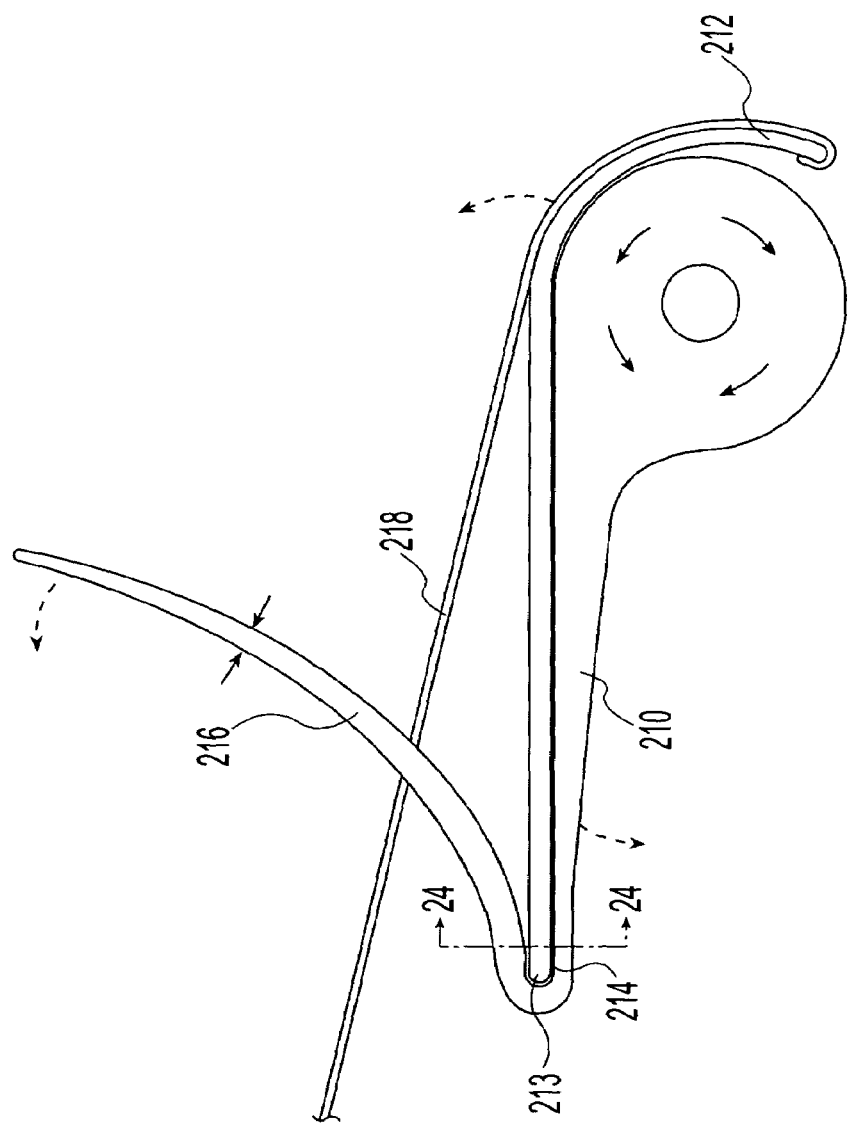
FIG. 23 is a view in side elevation of the preferred embodiment of the invention.

Preferred Embodiment. FIGS. 23 and 24 illustrate the preferred embodiment for a bicycle transmission. A spring holder 210 is fixed to, and rotates in alternating motion with, the ratchet alternating member (not shown) and is biased by a return spring extending to the bicycle frame so as to return the holder 210 to the condition illustrated. A fiberglass cantilever drive spring 212 has one end 213 held in a pocket 214 formed between the spring holder 210 and a backup wall 216. The spring holder 210 and the backup wall 216 are formed unitarily of fiberglass so they too can flex elastically in the manner of a spring. In this embodiment, the preferred contour of the backup wall 216 is an involute. A flexible drive linkage, constructed of a tension cable 218, extends through a slot 220 extending longitudinally through the backup wall 216 into connection with an input driving member (not shown). As the tension cable 218 pulls on the drive spring 212, the drive spring 212 flexes toward the backup wall 216. Because all the components of the assembly (spring, backup wall and spring holder) are elastic, they flex so as to allow in the limit of no wheel rotation, the full deflection of the crank to which the tension member is attached. In this design, the crank has a throw of 65 mm, so that the assembly must allow at least twice that total displacement of the tension cable 218 when the wheel is locked.

In this design, the transmission crank is driven to about 6 times the pedal shaft rotation by a chain drive like that illustrated in FIG. 20, so that in normal operation, with the rider pedaling about 60 rpm, the crank is rotating about 360 rpm, and the spring is cycled about 6 times a second. Fiberglass springs have an advantage in their high energy storage per unit mass, and their large deflection without fatigue or permanent distortion.

At low wheel torque, there is little flexure of the elements, and the tension cable rotates the wheel approximately 120 degrees per crank half turn. There are two identical spring assemblies, one on either side of the driven wheel, so that at low torque, for a full crankshaft turn, the wheel rotates about 240 degrees. As wheel torque load increases, spring and assembly deflection increase and the wheel rotates less and less, until at locked wheel condition deflection is maximum, the spring extends its full amount and the maximum torque is imposed on the wheel. This maximum torque is determined by the geometry and stiffness of the system, and in this preferred bicycle transmission is about 100 newton-meters, but could be increased to 150 newton-meters for stronger riders. For highly athletic bicycle competitors, it could be increased to 300 or even 400 newton-meters.

Figure 25:
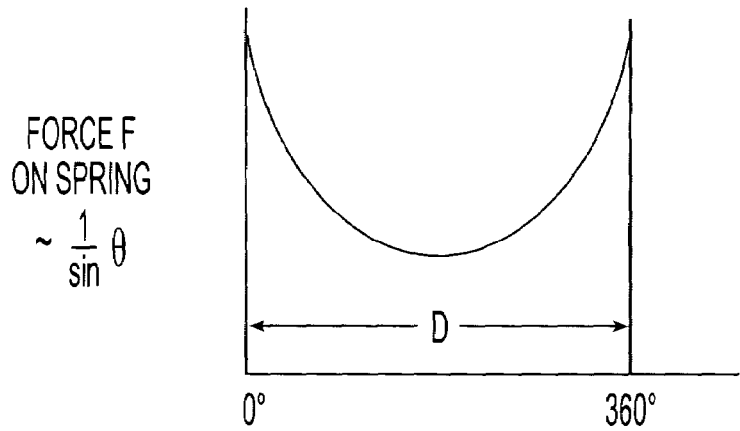
FIG. 25 is a graphical illustration of the drive spring force as a function of the angular displacement of the crank input driving member for the preferred embodiment of FIG. 23.
Figure 26:
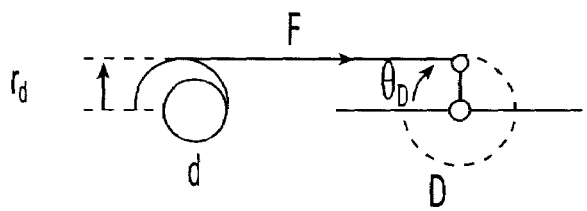
FIG. 26 is a diagram illustrating the variables graphed in FIGS. 25, 27 and 28.

FIG. 25 shows a force-deflection relationship for the drive spring of the preferred embodiment of FIG. 23 with its variables and dimensions illustrated in FIG. 26. The force is inversely related to the sine of the crank angle of the input driving crank, so as to allow an approximately constant torque on the input driving crank over its rotation. Of course in reality, the torque on D is always zero at 0 and 180 degree rotations relative to the driven tensile member, since at those angles the force on the tensile member goes thru the center of D and there is no moment arm for a force, no matter how large, hence no torque. More particularly, because of the geometrical configuration of the embodiment of FIG. 23, when the input driving crank is in the region of 0° and 360° of rotation (i.e. its crank pin is closest to the ratchet and the spring is most relaxed against the spring holder 210) the force from the tension cable 218 is applied in a direction longitudinally along the spring so that a large component of force applied to the spring is acting in a direction to longitudinally compress the spring. However, as the drive spring 212 deflects and bends outwardly away from the spring holder 210, the force tending to longitudinally compress greatly decreases and the force is applied principally to bend the spring. Therefore, the spring force decreases very rapidly, even if the spring force coefficient is non-linear with the spring force increasing exponentially as a function of spring deflection. This is possible because the spring force is not only a function of the spring deflection but also a function of the instantaneous geometrical configuration. Then, as the 360° angle of rotation is approached, the spring force increases very rapidly for the same reason.

Figure 27:
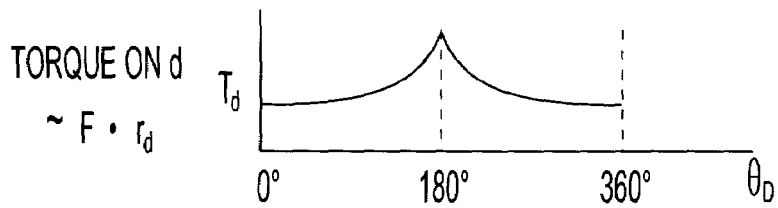
FIG. 27 is a graphical diagram illustrating the torque of the output driven member d of the preferred embodiment of FIG. 23 as a function of the angular displacement of the crank input driving member D of the preferred embodiment of FIG. 23.
Figure 28:
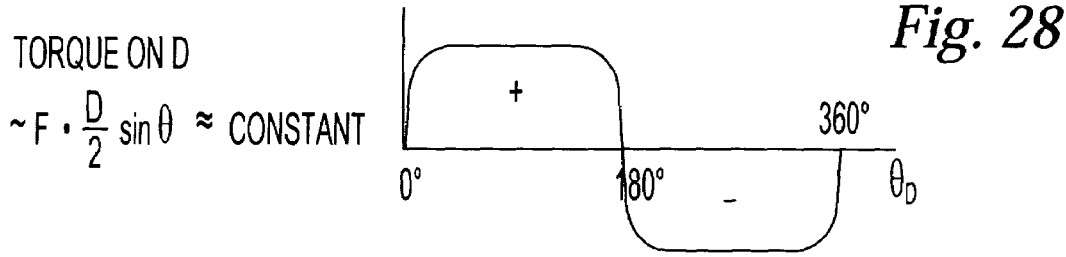
FIG. 28 is a graphical diagram of the torque applied to the crank input driving member for the preferred embodiment of FIG. 23 as a function of the angular displacement of the crank input driving member D of the preferred embodiment of FIG. 23

The result of this is that the torque applied to the output driven member results in instantaneous torque pulses illustrated in FIG. 27 and torque at the input driving crank as illustrated in FIG. 28.

Spring Design. The prior art has many well-known methods for designing springs with any desired force-deflection characteristic. Spring design may be assisted by any of several, commercially available, finite element stress analysis programs, such as ALGOR.

FIGS. 29–32 illustrate a graphical procedure. The procedure described is graphical because this method is easily understood, but it can be duplicated by analytical or computer simulation methods that are less transparent but well known to the art, and that can result in accuracy to any level desired.

Figure 29:
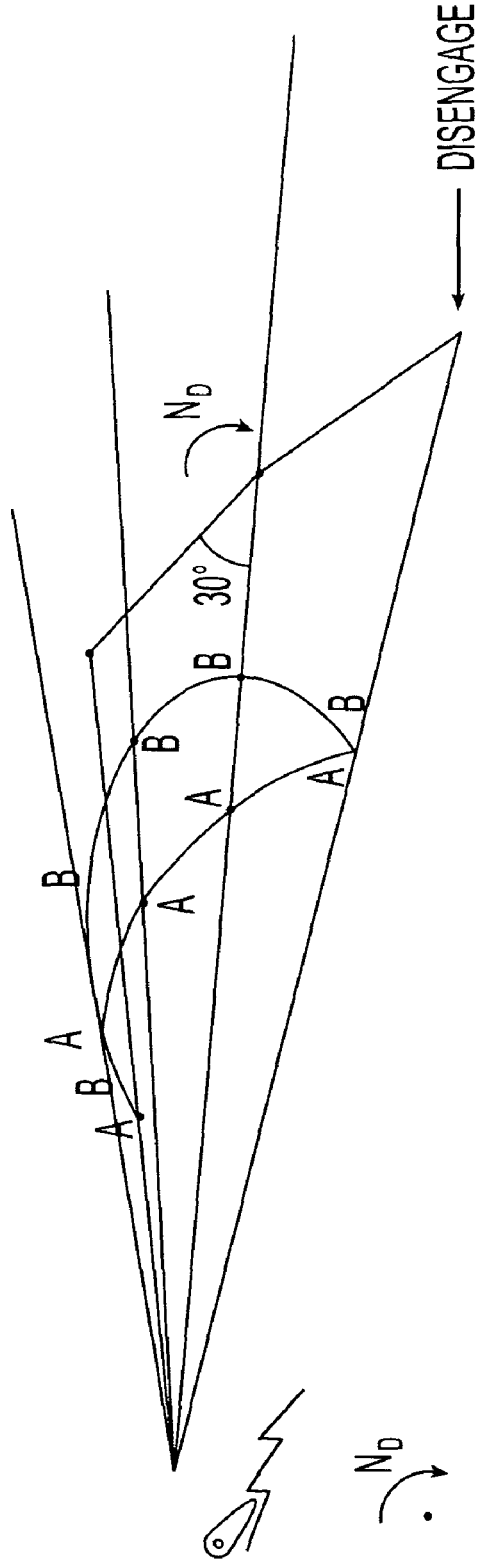
FIG. 29 is a graphical diagram illustrating the design of a drive spring component of the invention.

Referring to FIG. 29, consider the simple case where the input driving crank D and the output driven ratchet shaft d are both of the same radius, R, and D has a rotational speed twice that of d. As shown in FIG. 25, the resulting angle of engagement, ø, is 30 degrees of crank rotation, at which point the speed of the connecting tape is equal to the speed of the ratchet alternating motion member and the ratchet is engaged. After this point, the tape on d is moving at the speed of the perimeter of d, and the tape on the crank is moving at a varying speed. The trajectory of points A and B, initially together on the tape at the moment of ratchet engagement, now separate as a result of the differing speeds of d and the crank on D and can be traced by simple graphical methods as shown in the FIG. 29. Point A moves outward as a result of the tape unrolling from d, and B moves leftward, keeping a constant distance from the crank. The result is a separation of A and B representing a stretch of a spring along the line of the tape, which can be measured at any desired crank angle as shown in FIG. 29.

The deflection of the spring starts at zero at the angle of engagement of the ratchet, ø, in this case approximately 30 degrees in FIG. 29, and increases to a maximum at approximately 150 degrees of rotation of the crank. After that point, the deflection reduces rapidly to the zero value at the intersection of the trajectory of A and B at approximately 230 degrees of rotation of the crank. At this point there is no more tension on the spring and the ratchet disengages on d and the tape rewinds to a minimum length at about the zero degree position. The cycle then repeats, beginning with an acceleration of the ratchet alternating motion member and tape to the reengagement point at 30 degrees.

By this method the stretch of the spring can be found for any angle of rotation of the crank on D and for any ratio of shaft speeds. The next task is to determine the necessary spring force-deflection relation.

Figure 30:
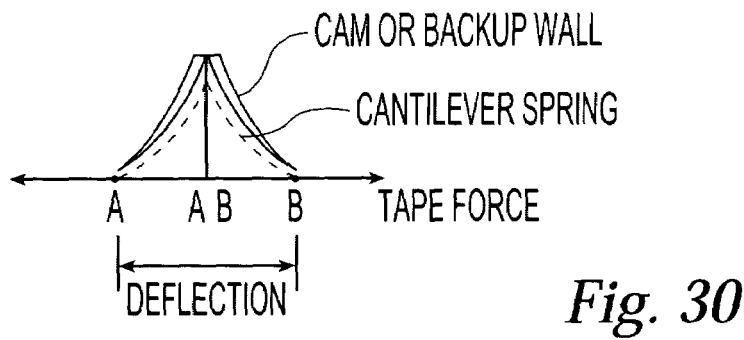
FIGS. 30, 31 and 32 are graphs illustrating spring and transmission characteristics of the invention.
Figure 31:
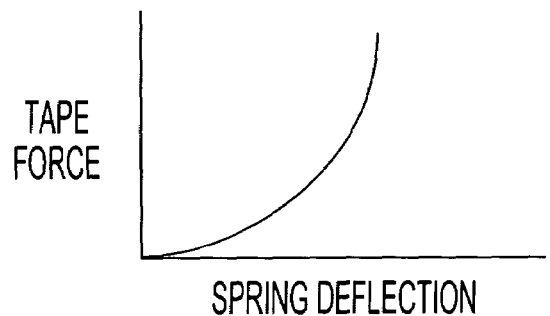
Figure 32:
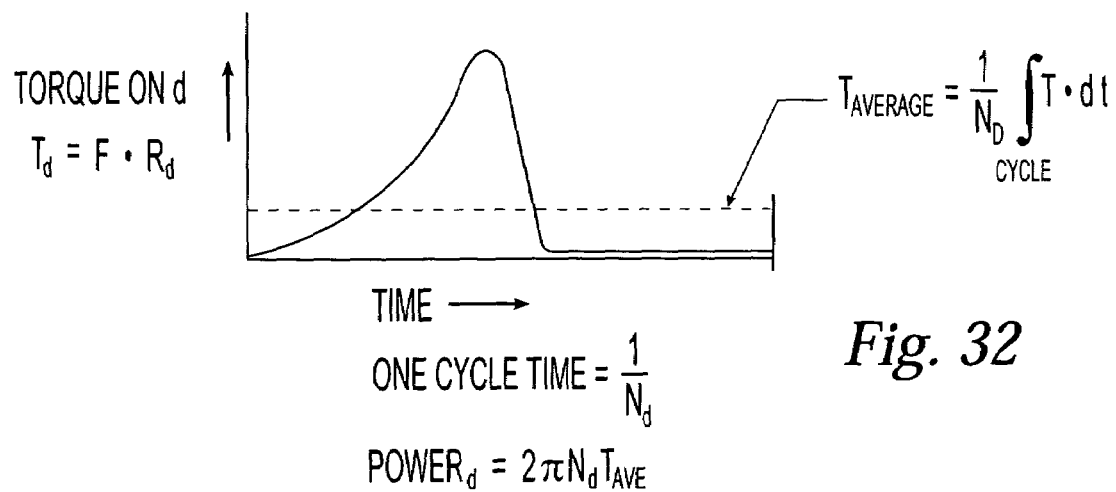

There are well-known methods to design a spring with any desired force-deflection relation. In this example, a spring flexing over a cam is used as shown in FIG. 30. The force needed to cause a given deflection is dependent on the thickness, width and material of the cantilever spring, and the shape of the cam. For a bicycle transmission, the desired power transmitted is assumed to be approximately 100 watts at 6 revolutions per second of D. Therefore the force-deflection relation desired for the spring should be such as to give that power transfer. The required mathematical relations are shown on FIG. 32, from which the spring and cam may be designed. Many combinations of spring geometry and cam shape may give the desired result. In the case of a design that is intended to give a constant input power over a wide range of relative shaft speeds, as would be desired in a bicycle application, the spring and cam design would start at the highest speed ratio, where the spring deflection is least, and step progressively to a lower speed d with speed D kept constant. Thus the cam and spring geometry design would be determined stepwise from the lowest deflection at the highest speed ratio down to zero speed of d, at which point the spring deflection is maximum. At each step the increment of spring force would be chosen to keep the power constant. For the purposes of initial design, it is assumed that there is no power loss and the power delivered to D by the power source is identical to the power delivered from D to d.

From FIGS. 29–32, it is evident that, for constant power, the averaged torque on d must be inversely related to the angular velocity of d. This averaged torque is the integral (sum) of the torque over the time of the cycle, averaged over time. As the angular speed of d decreases, the total fraction of the rotation during which the ratchet is engaged increases, the deflection increases and maximum force increases nonlinearly with deflection. Thus the average torque integral increases rapidly as the speed of shaft d decreases, and can be made to have the desired inverse relation to angular speed by appropriately shaping the spring and cam.

There is a limit to the available torque on the shaft d, as determined by the total force capable of being transferred between the two shafts. In the case being considered, let us say that the maximum averaged torque that the system can develop is 150 newton-meters, a reasonable maximum torque value for a bicycle transmission. The minimum shaft speed of d at which 100 watts can still be transferred is then N=100/2n·150, or 0.1 revolution per second, or 6 rpm.

Below this speed the delivered power drops rapidly with speed to zero at zero speed, since the torque applied remains approximately constant.

It is also of interest to note the effect of a change of rotational speed of D at a fixed speed of d. If the speed of D increases, then the average torque on d increases very rapidly, since this torque is affected by the fraction of the cycle the ratchet is engaged, by the maximum deflection of the spring, and by the number of cycles per second, all of which increase in some proportion to the speed of shaft D. Thus the averaged torque on d increases to some power of the speed of D, approximately the 4th power, since the maximum torque increases non-linearly with speed ratio. This means in practice that a cyclist would feel a very rapid increase in power required to increase pedal speed from 60 rpm to 90 rpm, roughly a factor of 1.5 to the fourth power or 5 times. This is a desired characteristic for bicycle transmissions, since humans produce their maximum power somewhere within this range of pedaling speed. Conversely, if the rider wished to reduce power input, a slight decrease in pedaling speed would drop the power flow rapidly to any desired value, down to zero at the speed of D at which the ratchet does not engage during the cycle and there is no net torque on d.

FIGS. 23 and 24 show a preferred embodiment, described above, for a bicycle transmission, in which the drive spring is incorporated with the ratchet around shaft d, in such a way that as force transmitted increases, the moment arm of the force on d also increases, so that there is a multiplication of the rise in torque with spring deflection, in proportion to both force and to moment arm. The design procedure for this arrangement is identical to that described above, with the addition of the effect on torque of the change in moment arm as well as force at each incremental step in the solution.

The total power flowing to d is proportional to the average torque and the number of crank throws on D, so that if, for example, there were three crank throws and a desired power flow of 100 watts, each crank-ratchet pair would need only transmit 33 watts.

The spring illustrated in FIGS. 23 and 24 has a width of about 30 mm and a thickness of about 5 mm. The backup wall in those figures was chosen as an arc of a circle having a radius of curvature of 140 mm. The radius of curvature of the backup wall for a fixed maximum spring stress is inversely proportional to the desired maximum fiber stress and directly proportional to the thickness of the spring at its point of contact with the backup wall. Thus, for a spring of constant thickness and desired tensile stress, the curvature of the backup wall is a constant along its length, i.e. a segment of a circle with its tangent point at the end of the spring initially on the backup wall.

Qualitative Observations. Embodiments of the invention act like a purely mechanical non-loss, infinitely variable speed/torque transmission having the ideal transmission characteristic of transfer of all power input to the output shaft at any output shaft speed down to near zero as shown in the torque ratio vs. speed ratio curve of FIG. 19. No elements of the transmission have intrinsic power loss, so that, in the limit, the efficiency of power transfer can approach 100%. Multiple throws of the crank, each as described above, can give near constant torque vs. time on D and d. As the rider, or any other prime mover, applies input energy to the input driving member, such as a crank, that energy is distributed between storage in one or more springs and the output to drive the vehicle. With a multiple spring system some of the input energy, is stored in the springs and moved between the springs as the springs cycle through their respective increased and decreased deflection.

In operation a bicycle rider never feels the need to stand on the pedal for maximum torque as is conventionally necessary when, for example, climbing a steep hill. Instead, the rider can always pedal at maximum power speed on the foot pedal crank mechanism, usually between 60 and 90 rpm. This is because the system acts automatically to give approximately the optimum speed ratio for maximum power at any rear wheel speed down to zero and up to the maximum speed condition (i.e. little spring deflection, low torque operation with driven shaft speed approaching driving shaft speed).

In embodiments of the invention applied to a bicycle, average torque input, averaged over each cycle of operation, is approximately constant for a constant pedal speed even though bicycle speed changes. If pedal speed is increased, more power is supplied by the rider, power being proportional to torque multiplied by speed.

At low speed, the rider feels the largest, longest instantaneous torque pulses. As speed increases with pedal speed remaining constant, the height and duration of the torque pulses are both reduced. If the rider increases pedal speed, the height and duration of the instantaneous torque pulses increase and therefore the output torque increases so the greater the acceleration.

As the rider approaches the desired cruising speed, the rider can pedal slower, the height and duration of the torque pulses decrease, the average torque decreases and acceleration will stop to give a constant velocity. So a rider receives the same feeling as on regular bike. If pedaling speed is increased, power input is increased and speed increases. However, there will be a rider upper limit to pedaling speed so there is a maximum speed at which the instantaneous torque pulses become short.

If a hill is encountered, the rider can either (1) pedal the same speed, in which case the torque pulses will become higher and longer, the bike will slow down and the torque felt by the rider will increase only slightly or stay the same; or (2) pedal faster, in which case the torque pulses will become even higher and if the rider pedals fast enough, speed can be maintained.

This transmission is equally suited to other vehicles, such as automobiles, in which multiple throws of input crank shaft D would provide smooth operation, and if desired, a differential effect with two shafts d driven at different speeds by the same primary shaft D. More than two shafts can also be driven by a single driving shaft, with the driven shafts d all operating at different speeds despite the fixed speed of driving shaft D.

It is also of course possible to combine this variable speed ratio transmission with a conventional shift transmission to extend the operating speed range.

Non-Slipping, All Wheel Drive. Because, as described above, a transmission embodying the invention has the two characteristics that it (1) automatically adjusts to the speed and torque of the output driven member, and (2) applies torque to the output driven member, even when the driven member is not rotating, embodiments of the invention are able to provide the function of a non-slipping differential and multi-wheel drive for a vehicle. Each wheel is driven by its own transmission. Consequently, when the vehicle turns, the radially inward wheel may turn more slowly than the radially outward wheel and torque is applied to all wheels, even a wheel which is not rotating.

Figure 33:
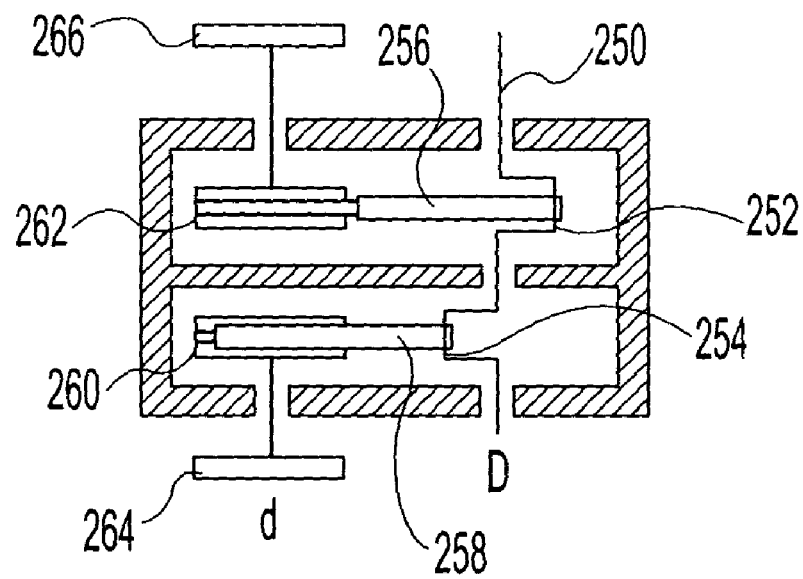
FIG. 33 is a diagrammatic view illustrating an alternative embodiment of the invention in which multiple embodiments are used to provide a non-slip, differential function.

FIG. 33 diagrammatically illustrates one way this may be accomplished. An input driving member crank 250 has a pair of crank pins 252 and 254 connected through flexible drive linkages 256 and 258 to the drive springs of two different ratchets 260 and 262 each constructed to embody the invention. The continuous rotary motion driven member of each ratchet is drivingly linked one of the respective wheels 264 and 266.

These principles can be applied to more than two wheels and is not limited to use of a single crank input driving member. Transmissions can drive several shafts simultaneously at different speeds. Thus, the function usually served by a differential can be partially done by the present transmission by allowing some of the crank throws to be attached to a ratchet on one shaft, and the other throws to a ratchet on the second shaft. When the vehicle is turning and one wheel is rotating at a slower rate than the other, the slower wheel sees a higher torque than the faster one, but both are driven. This effect can be carried down to the extreme case where one wheel is not moving at all and the other one is moving or when one wheel is slipping and the others retain a grip on the road. The slipping wheel will take little power from the transmission. Just as with a standard differential, the power flow is from the driving shaft to the wheel moving the most, with the spring retraction of the non-moving wheel driving the moving wheel. These characteristics of the invention make it applicable to multi-wheel drives, such as the popular four wheel drive.

This differential-like effect can be used to advantage in a pedaled tricycle, where each of the two rear wheels can be driven by a transmission embodying he invention driven by a two throw crank with one tape drive going from one throw to the transmission of one wheel and the other tape going from the other throw to the transmission of the other wheel. The elimination of need for a differential would save weight, complexity and cost while retaining the advantages of two wheel drive.

Figure 34:
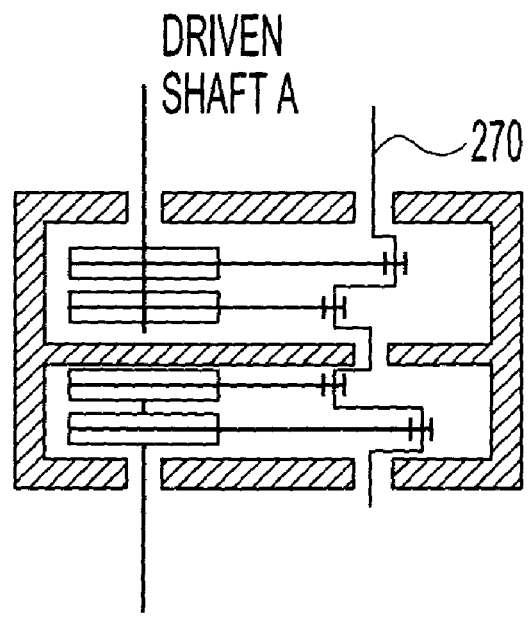
FIG. 34 is a diagrammatic view of an alternative embodiment of the invention.

FIG. 34 illustrates the same operation but with the use of multiple replications embodying the invention applied to each wheel for purposes of phasing and smoothing of the pulses and/or for extending the range of the available torque and speed ratios as now described.

Parallel Transmissions for Extending Drive Ratio Range. The same general characteristics of the transmission can be used in another way, that is, the driving shaft can drive either side of the driven shaft at two different speed ratios, so that for example, in a bicycle, one side of the rear wheel is driven at a low speed ratio and the other side is driven at a higher speed ratio, as determined by their respective wheel sprocket diameters. This has the advantage of widening the range of torque ratios with no shifting, one side providing a high torque at lower speed, and the other side providing more torque at higher speed, even though both sides are driving the rear wheel simultaneously at all speeds.

Figure 36:
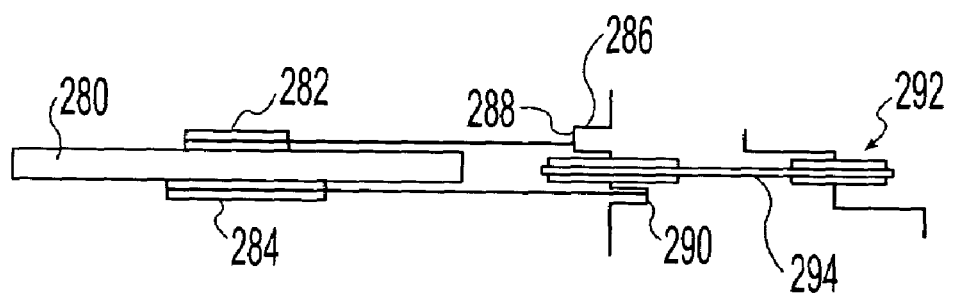
FIG. 36 is a diagrammatic view of another alternative embodiment of the invention for broadening the torque ratio range of the transmission.

For example, as illustrated in FIG. 36, the left side of a bike wheel 280 can have a spring and ratchet 282 which is ¾ the diameter of the spring and ratchet 284 on the right side, with both springs (as in FIG. 23 showing the preferred embodiment) driven by the same driving member crankshaft 286, with both throws 288 and 290 the same. For a bicycle, the driving member crankshaft 286 may be driven by a conventional bicycle pedal crank mechanism 292 which is drivingly linked to the driving member crankshaft 286 by a conventional drive chain 294.

At low speeds the right side spring would deploy to a higher torque than the left hand side, and at high wheel speeds, the right side would contribute less to wheel torque due to its slower speed and lower time of ratchet engagement, and the left side, due to its smaller diameter relative to the crank throw, would contribute a longer duration torque pulse to the wheel.

Adjustable Crank Throw. In addition to the above features, a transmission of this type could have a variable diameter crank throw on D, as for example, one actuated by centrifugal force so as to increase the effective diameter of the crank D as shaft D speed increases. This would have the effect of extending the speed ratio of the transmission to higher rotating speeds of d while at the same time enhancing the rapid rise of power vs. rotational speed of D, that is to say, making the transmission more nearly a constant speed one regardless of input power.

Figure 35:
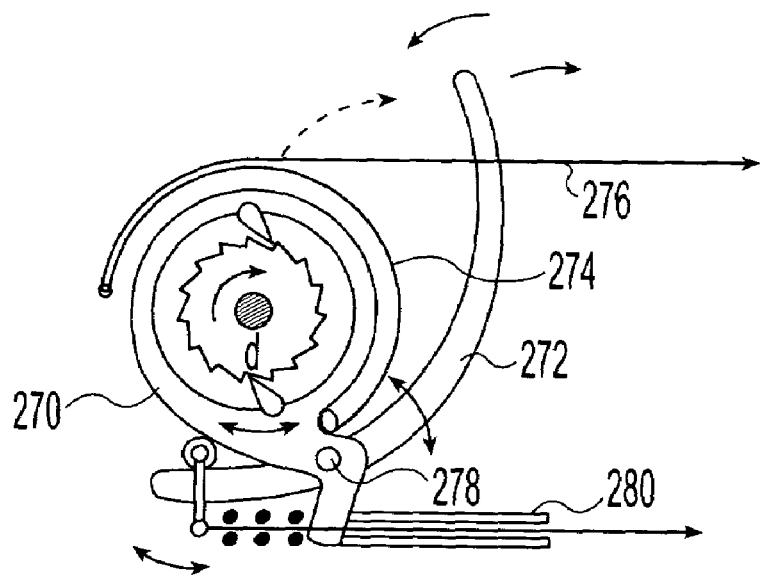
FIG. 35 is a diagrammatic view of another alternative embodiment of the invention.

Adjustable Power Level. In order to allow adjustment of the transmission to the skill and power of the rider, the backup wall can be made adjustable so as to relax or stiffen the force-displacement relation of the spring-backup combination. Movement of the backup wall away from the spring reduces the stiffness-deflection relation and lowers the maximum torque and power of the transmission. FIG. 35 shows a ratchet alternating motion member 270 having a backup wall 272 engageable by a drive spring 274. The drive spring 274 is displaced by a flexible drive linkage 276 in the manner describe above. However, the backup wall 272 is pivotally mounted by pivot pin 278 and its angular displacement is controlled by a control cable 280. The control cable allows the backup wall 272 to be adjustably pivoted to positions closer or further from the drive spring 274.

This adjustable backup wall feature can be combined with the previously described feature in which the backup wall itself is resilient so it acts as a spring.

Figure 37:
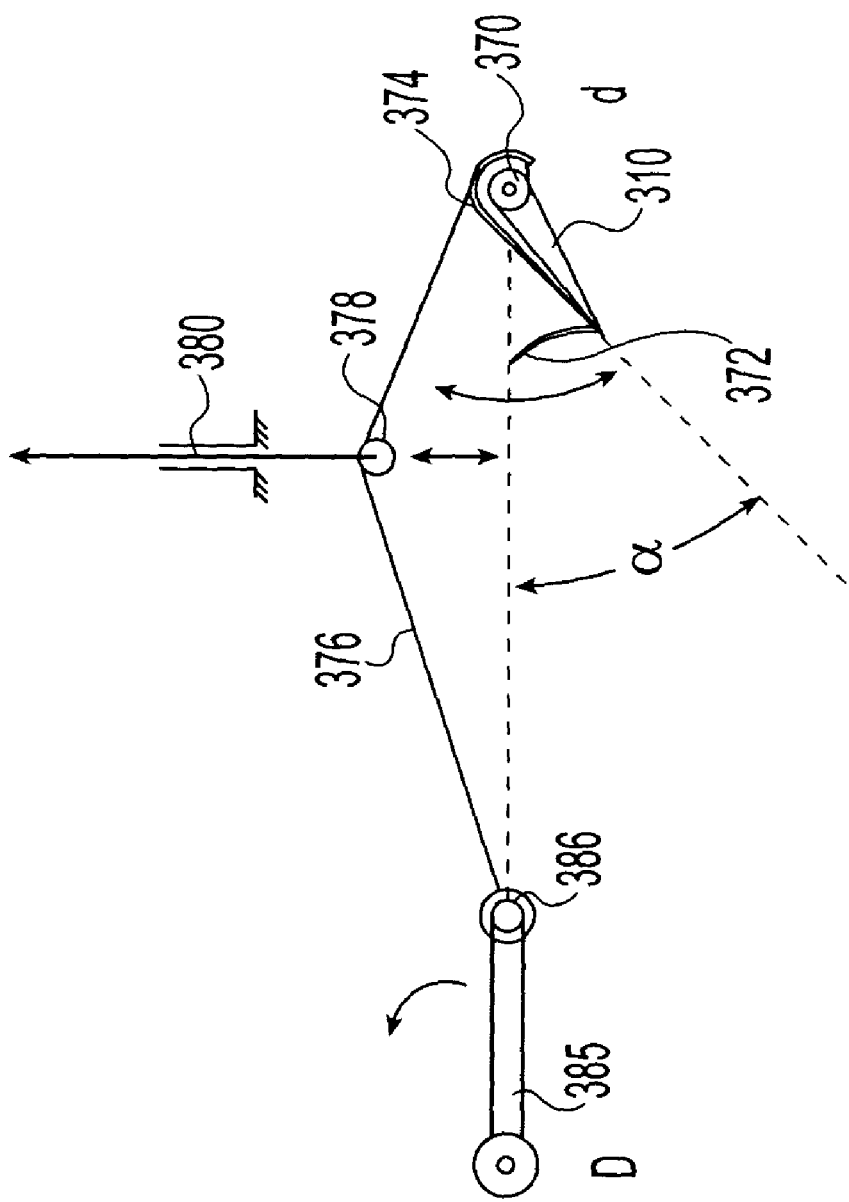
FIG. 37 is a diagrammatic view of an alternative embodiment for adjusting the transmission to the skill and power capability of a bicycle rider.

A preferred structure for allowing adjustment of the transmission to the skill and power of the rider, or to allow low pedal torque on startup is illustrated in FIG. 37. The backup wall 372 is adjustable in geometrical position relative to the spring so as to relax or stiffen the force-displacement relation of the spring-backup combination. Engagement of the spring 374 with the backup wall 372 later in the angular rotational cycle of the input crank 385, as the spring 374 deflects, reduces the stiffness-deflection relation and lowers the maximum torque and power of the transmission. Stated another way, if the length of the portion of the spring 374 lying against the backup wall 372 is adjusted so that it is less at a given angle of angular rotation of the input crank 385, the maximum torque and power of the transmission is lowered. Conversely, if that length is made more, the maximum torque and power of the transmission is increased. FIG. 37 shows a ratchet alternating motion member 370 like that of FIG. 23 having the backup wall 372 engageable by the drive spring 374. The drive spring 374 is displaced by a flexible drive linkage 376 in the manner described above. However, the backup wall 372 and spring 374 may be varied rotationally in their return position, as driven by the return spring (not shown in FIG. 37), by a roller 378 which is rotationally mounted to an axle, engages on the flexible linkage 376 and is controlled in position by a control cable 380. The control cable 380 adjusts the roller 378 laterally of the flexible linkage 376 (up and down in FIG. 37) to vary the path of the flexible drive linkage 376. Raising the roller 378 causes the spring holder 310 together with the backup wall attached to it to rotate through an angle $\alpha$. This allows a variation of the return position of the spring 374 and backup wall 372 since, if the roller pulls the flexible linkage up from a straight line between crank pin 386 and ratchet member 270, then the spring and backup wall return not to a position in line with the flexible linkage ($\alpha=0°$-horizontal) but to a lower position as shown in FIG. 37. At this lower return position the effective force-deflection relation of the spring is reduced, since it encounters the backup wall at a greater angular deflection of crank pin 386 than it would if the roller allowed a full return to a straight line connection between the spring and crank pin. The lower return position also reduces the initial force required to rotate the spring 374, since the force is applied more nearly at right angles to the spring. The control cable 380 may be adjusted by the rider or by a computer as is well known in the art.

While certain preferred embodiments of the present invention have been disclosed in detail, it is to be understood that various modifications may be adopted without departing from the spirit of the invention or scope of the following claims.

The invention claimed is:

1. A mechanical transmission for transmitting input mechanical energy from a source of input mechanical energy to an output driven member, the transmission having an automatic, continuously variable drive ratio and converting alternating motion to rotary motion, the transmission comprising:
   (a) an input driving member which is drivable in alternating motion by the source of input mechanical energy;
   (b) a ratchet including an alternating motion member and a continuous motion, rotary, output member forming said output driven member;
   (c) a drive spring drivingly linked between the ratchet alternating member and the input driving member for transmitting a force applied to the input driving member to the ratchet alternating member in one direction, wherein the input driving member is drivingly linked to the ratchet alternating member by the drive spring linked to a flexible drive linkage; and
   (d) a return spring drivingly linked to the ratchet alternating member for applying a return force upon the ratchet alternating member opposite to the force applied by the drive spring.

2. A mechanical transmission for transmitting input mechanical energy from a source of input mechanical energy to an output driven member, the transmission having an automatic, continuously variable drive ratio and converting alternating motion to rotary motion, the transmission comprising:
   (a) an input driving member which is drivable in alternating motion by the source of input mechanical energy;
   (b) a ratchet including an alternating motion member and a continuous motion, rotary, output member forming said output driven member;
   (c) a drive spring drivingly linked between the ratchet alternating member and the input driving member for transmitting a force applied to the input driving member to the ratchet alternating member in one direction, wherein the drive spring has a nonlinear force coefficient which is an increasing function of drive spring displacement so that force and stored energy per unit of displacement increase with displacement; and
   (d) a return spring drivingly linked to the ratchet alternating member for applying a return force upon the ratchet alternating member opposite to the force applied by the drive spring.

3. A mechanical transmission for transmitting input mechanical energy from a source of input mechanical energy to an output driven member, the transmission having an automatic, continuously variable drive ratio and converting alternating motion to rotary motion, the transmission comprising:
   (a) an input driving member which is drivable in alternating motion by the source of input mechanical energy;
   (b) a ratchet including an alternating motion member and a continuous motion, rotary, output member forming said output driven member;
   (c) a drive spring drivingly linked between the ratchet alternating member and the input driving member for transmitting a force applied to the input driving member to the ratchet alternating member in one direction wherein the drive spring is a cantilever spring which, in the most relaxed position of the return spring, extends circumferentially at least partially around and into connection to the ratchet alternating member; and
   (d) a return spring drivingly linked to the ratchet alternating member for applying a return force upon the ratchet alternating member opposite to the force applied by the drive spring.

4. A transmission in accordance with claim 3 wherein the input driving member is drivingly linked to the drive spring by a flexible drive linkage.

5. A transmission in accordance with claim 3 wherein the drive spring has a nonlinear force coefficient which is an increasing function of spring displacement so that force and energy per unit of displacement increases with spring displacement.

6. A transmission in accordance with claim 3 and further comprising a drive spring backup wall fixed at a first end to the ratchet alternating member and extending outwardly along a curved path from near a place of attachment of the drive spring to the ratchet alternating member, the backup wall being positioned outwardly of the drive spring and aligned for engagement by the displaced drive spring.

7. A transmission in accordance with claim 6 wherein the drive spring backup wall is resilient to provide a spring force against the drive spring when the drive spring seats against the backup wall to elastically increase the effective spring force applied by the drive spring.

8. A transmission in accordance with claim 6 wherein the input driving member is a crank having a crank pin rotatably and drivingly linked to the drive spring.

9. A transmission in accordance with claim 8 wherein the input driving member is drivingly linked to the drive spring by a flexible drive linkage.

10. A transmission in accordance with claim 6, wherein the backup wall is adjustably movable to selected positions in the path of the drive spring for varying the drive spring displacement at which the drive spring engages the backup wall.

11. A transmission in accordance with claim 3 and further comprising:
    (a) a crank having a plurality of crank pins angularly spaced around a crank axis of rotation;
    (b) a plurality of said ratchets, each ratchet including an alternating motion member and a continuous motion, rotary, output member, the output members being fixed together to form said output driven member;
    (c) a plurality of drive springs, each drive spring rotatably linked to one of the crank pins and drivingly linked to one of the ratchet alternating members, each drive spring transmitting a force applied to an input driving member to a ratchet alternating member in one direction; and (d) a plurality of return springs, each return spring drivingly linked to one of the ratchet alternating members for applying a return force opposite to the force applied by the drive springs.

12. A transmission in accordance with claim 3 and further comprising a dual crank bicycle pedal mechanism drivingly linked to the crank input driving member through a fixed ratio transmission, the ratio of the fixed ratio transmission driving the crank input driving member at a higher angular velocity than the bicycle pedal mechanism.

13. A plurality of transmissions in accordance with claim 3, each of said transmissions drivingly linked to a different wheel of a vehicle for applying torque to the wheel to which a transmission is linked while permitting wheels to rotate at different angular velocities.

14. A transmission comprising at least two transmissions in accordance with claim 3, each of said transmissions having its output driven member drivingly linked to a same wheel of a vehicle and drivingly linked to an input driving member for being driven at different angular velocities by its input driving member.

15. A transmission in accordance with claim 14, wherein the ratchet alternating members of the transmissions have different diameters.

16. A transmission in accordance with claim 6, wherein the input driving member is a crank and is drivingly linked to the drive spring by a flexible drive linkage and the transmission further comprises a roller rotationally mounted to an axle and engaging the flexible drive linkage, the axle being movably adjustable laterally of the flexible drive linkage for varying the path of the drive linkage.

17. A transmission in accordance with claim 16, wherein the axle is connected to a movable control cable for movably adjusting the lateral position of the roller.

* * * * *